TEXT# United States Patent
Ramani et al.

(10) Patent No.: US 7,337,093 B2
(45) Date of Patent: Feb. 26, 2008

(54) SYSTEMS AND METHODS FOR COLLABORATIVE SHAPE AND DESIGN

(75) Inventors: Karthik Ramani, West Lafayette, IN (US); Aliasgar Ganiji, West Lafayette, IN (US); Nikhil Vishwanath Joglekar, West Lafayette, IN (US); Mahendra Babu Arugundram Hrikrishna Moorthy, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 339 days.

(21) Appl. No.: 10/286,413

(22) Filed: Oct. 31, 2002

(65) Prior Publication Data

US 2003/0103089 A1 Jun. 5, 2003

Related U.S. Application Data

(63) Continuation-in-part of application No. 10/237,267, filed on Sep. 6, 2002.

(60) Provisional application No. 60/318,222, filed on Sep. 7, 2001.

(51) Int. Cl.
*G06F 17/50* (2006.01)

(52) U.S. Cl. ............................. 703/1; 700/98; 345/427

(58) Field of Classification Search ................ 703/2, 703/1; 700/98; 345/419, 420, 427, 428
See application file for complete search history.

(56) References Cited

U.S. PATENT DOCUMENTS

| | | | |
|---|---|---|---|
| 5,749,908 A | 5/1998 | Snell | 607/30 |
| 5,821,925 A | 10/1998 | Carey et al. | 345/331 |
| 5,940,082 A | 8/1999 | Brinegar et al. | 345/442 |
| 6,061,717 A | 5/2000 | Carleton et al. | 709/205 |
| 6,219,057 B1 | 4/2001 | Carey et al. | 345/419 |
| 6,222,551 B1 | 4/2001 | Schneider et al. | 345/419 |
| 6,226,422 B1 | 5/2001 | Oliver | |
| 6,230,171 B1 | 5/2001 | Pacifici et al. | 707/512 |
| 6,397,181 B1 | 5/2002 | Li et al. | |
| 6,401,069 B1 | 6/2002 | Boys et al. | |
| 6,496,190 B1 * | 12/2002 | Driemeyer et al. | 345/619 |
| 6,636,246 B1 * | 10/2003 | Gallo et al. | 715/805 |
| 6,650,339 B1 * | 11/2003 | Silva et al. | 345/619 |
| 6,748,419 B2 | 6/2004 | Grayson et al. | |

(Continued)

OTHER PUBLICATIONS

"3D View and Measure", *Solid Concepts Inc.*, Solid View,(1999),pp. 1-2.

(Continued)

*Primary Examiner*—Albert W. Paladini
(74) *Attorney, Agent, or Firm*—Woodard, Emhardt, Moriarty, McNett & Henry LLP

(57) ABSTRACT

One embodiment of the invention provides a computer-implemented method for collaborative three-dimensional (3D) markup. In this embodiment, the method includes obtaining a 3D representation of a shape on a client using a web-based interface, displaying the 3D representation of the shape in a user workspace, marking directly on a portion of the 3D representation of the shape in the user workspace, displaying the marked-up 3D representation of the shape, and sending the marked-up 3D representation of the shape to one or more additional clients using the web-based interface, wherein the additional clients are capable of displaying the marked-up 3D representation of the shape in their respective user workspaces.

21 Claims, 27 Drawing Sheets

U.S. PATENT DOCUMENTS

| | | | |
|---|---|---|---|
| 6,768,486 B1* | 7/2004 | Szabo et al. | 345/420 |
| 6,856,407 B2* | 2/2005 | Knighton et al. | 356/601 |
| 6,867,771 B2* | 3/2005 | Kripac | 345/420 |
| 6,958,752 B2* | 10/2005 | Jennings et al. | 345/420 |
| 7,069,192 B1 | 6/2006 | Freitag | |

OTHER PUBLICATIONS

"Alventive Quick Collaboration", *Alventive, Inc.*, http://www.alventive.com,(2001),pp. 1-4.

"AutoVue", *Cimmetry Systems, Inc.*, http://www.cimmetry.com/cimweb.nsf,(2002),pp. 1-17.

"eZmeeting", *Sigma Design*, http://www.ezmeeting.com/prod_index.html,(2002),pp.1-5.

"IntraVision", *PlanetCAD Inc.*, www.planetcad.com The leading enterprise-wide 2d/3d viewing solution,(2001),pp. 1-6.

"OneSpace Collaboration", *CoCreate Software GmbH & Co.*, http://www.cocreate.com,(2002),pp. 1-2.

"Real-time Interactive Design to Maximize Existing Investments in CAD and PDM", *Webscope, Inc.*, http://www.webscope3d.com,(1999),pp. 1-2.

"SpinFire Professional", *Actify, Inc.*, http://www.Actify.com,(2002),2 pages.

"Vis Mockup", *Electronic Data Systems Corporation*, (2002),pp. 1-17.

"Volo View Preview Guide", *Autodesk, Inc.*, http://www.autodesk.com/voloview,(2001),pp.1-6.

Bidarra, Rafael, "Collaborative Modeling With Features", *2001 ASME Design Engineering Technical Conferences*, (2001),pp. 1-3.

Chan, S., et al., "A solid modeling library for the World Wide Web", *Computer Networks and ISDN Systems, 30*, (1998),pp. 1853-1863.

Chan, S., et al., "Collaborative Solid Modeling on the WWW", *SAC*, (1998),pp. 598-602.

Harmon, R., et al., "The virtual annotation system", *1996 IEEE Virtual Reality Annual International Symposium Proceedings*, (1996),239-245.

Jung, T., et al., "Sketching annotations in a 3D Web environment", *Conference of Computing Factors and Human Systems*, (2002),pp. 1-2.

Jung, Thomas, "Space Pen, Annotation and sketching on 3D models on the Internet", *Design Machine Group*, (2000),pp. 1-13.

Kao, Y, et al., "CAD/CAM collaboration and remote machining", *Computer Integrated Manufacturing Systems*, 9(3), (1996),pp. 149-160.

Kao, Y., et al., "Development of a collaborative CAD/CAM system", *Robotics and Computer-Integrated Manufacturing*, 14, (1998),pp. 55-68.

Nam, T., et al., "CollIDE: A Shared 3D Workspace for CAD", http://www.Imu.ac.uk/ies/conferences/nam.html,(2002),pp. 1-5.

Neuwirth, C. M., et al., "Distributed collaborative writing: A comparison of spoken and written modalities for reviewing and revising documents", *Proceedings of the CHI '94 Conference on Computer-Human Interaction*, Boston. ACM., (Apr. 24-28, 1994),51-57.

Shyamsundar, N, "Collaborative virtual prototyping of product assemblies over the Internet", *Computer-Aided Design 00*, (2001),000-000.

Shyamsundar, N., "Internet-based collaborative product design with assembly features and virtual design spaces", *Computer-Aided Design*, (2001),637-651.

Turner, Alasdair, "Sketching a Virtual Environment: Modeling Using Line-drawing Interpretation", *ACM*, (1999),pp. 155-161.

Verlinden, J., et al., "Voice annotation: Adding verbal information to virtual environments", *Proceedings of the European Simulation Symposium*, (1993),60-69.

Bidarra, R., et al., "Web-based Collaborative Feature Modelling", *Procedding of the Sixth ACM Symposium on Solid Modeling and Applications*, http://www.cg.its.tudelft.nl,(Jun. 6-8, 2001),319-320.

\* cited by examiner

SYSTEMS AND METHODS FOR COLLABORATIVE SHAPE AND DESIGN

RELATED APPLICATIONS

This application is a continuation-in-part of U.S. application Ser. No. 10/237,267, filed Sep. 6, 2002, which claimed priority under 35 U.S.C. 119(e) from U.S. Provisional Application Ser. No. 60/318,222, filed Sep. 7, 2001, which applications are incorporated herein by reference.

FIELD OF THE INVENTION

The present invention relates to shape design, and more particularly to systems and methods for collaborative shape design.

BACKGROUND OF THE INVENTION

Today's product development process has witnessed tremendous change in recent years. Product development cycles, as well as their life spans, are getting shorter. More and more outsourcing of components results in increasing coordination and collaboration among various institutions within an enterprise, and across enterprises. Increasing globalization separates various project partners by space and time zones. Moreover, design activity is becoming more and more a joint effort of a highly qualified team. Participants in the design process contribute what they can in their different domains of expertise.

Collaborative shape design systems are slowly becoming a reality with the advent of the Internet and more powerful computers. Collaboration for product shape design, however, requires considerably broader capabilities than most other applications. For example, current computer-aided design (CAD) systems are designed to function as standalone programs. The front end, the libraries, the data, and the processor are present on the same computer. There is a growing need to move from standalone systems to collaborative systems, in which people located in different geographic locations can provide their input concurrently. The architecture for the current CAD systems cannot be extended to make it work in a distributed environment. There are systems that can provide collaborative viewing of a model, but these systems do not provide collaborative shape creation, editing, and deletion, particularly at the client end. Consequently, many aspects of collaborative product shape design have not been realized.

For the reasons stated above, and for other reasons stated below which will become apparent to those skilled in the art upon reading and understanding the present specification, there is a need for the present invention.

SUMMARY OF THE INVENTION

Various embodiments of the present invention are provided herein. One embodiment of the invention provides a computer-implemented method for collaborative three-dimensional (3D) markup. In this embodiment, the method includes obtaining a 3D representation of a shape on a client using a web-based interface, displaying the 3D representation of the shape in a user workspace, marking directly on a portion of the 3D representation of the shape in the user workspace, displaying the marked-up 3D representation of the shape, and sending the marked-up 3D representation of the shape to one or more additional clients using the web-based interface, wherein the additional clients are capable of displaying the marked-up 3D representation of the shape in their respective user workspaces.

This embodiment, as well as other embodiments, will be described in the detailed description below.

DETAILED DESCRIPTION

Figure 1A:
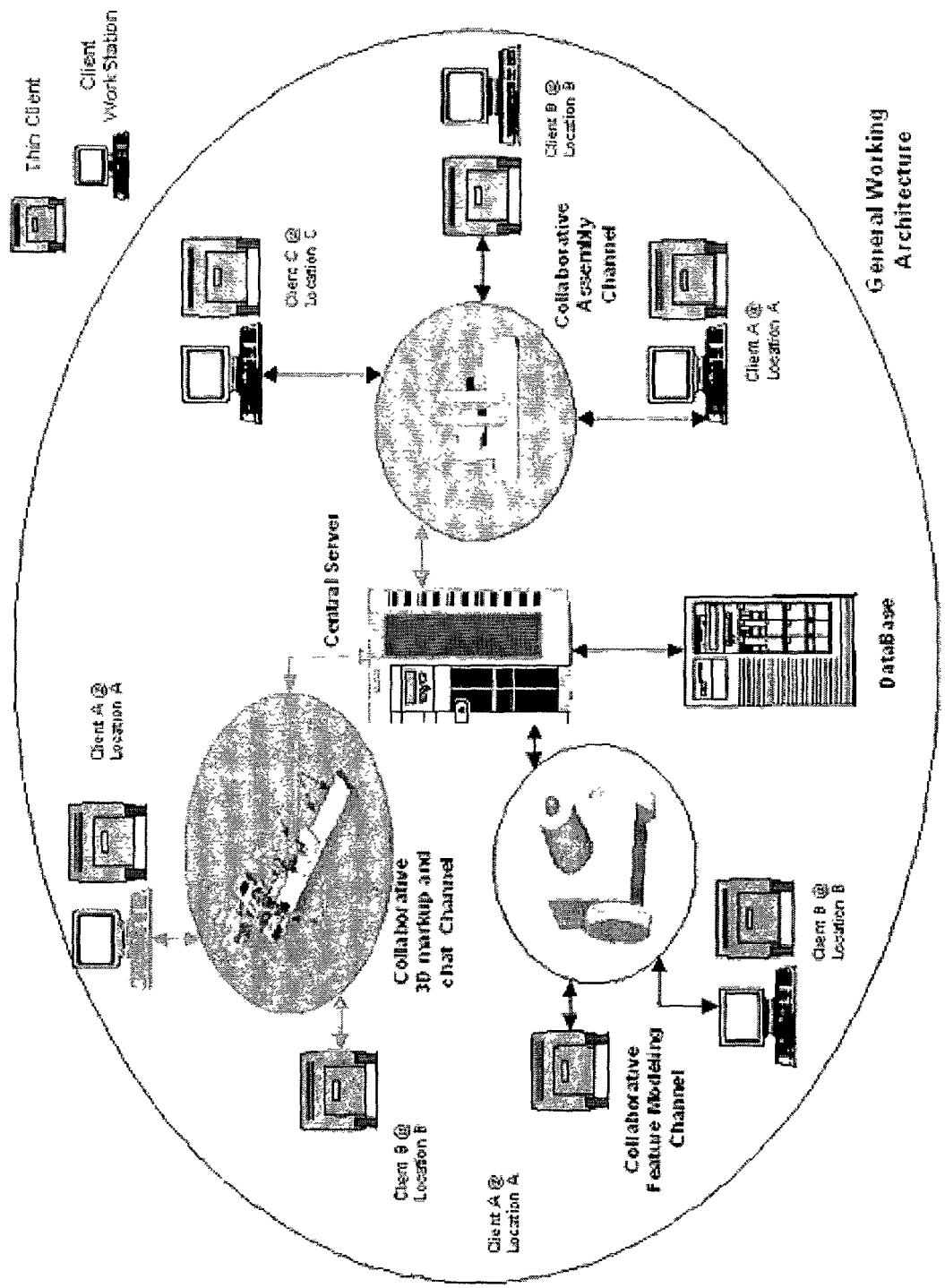
FIG. 1A illustrates a general working architecture of a collaborative system, according to one embodiment of the present invention.

In the following detailed description of the embodiments, reference is made to the accompanying drawings, which are shown by way of illustration of specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

Various embodiments of the present invention are described herein. One embodiment provides a web-based, platform independent system to collaboratively and synchronously create, delete, and edit shapes. In this embodiment, most of the computationally intensive functionalities (e.g., solid modeling and constraint solving operations) have been transferred to the server in order to reduce the size of the clients. The clients have different privileges in terms of the ability to edit the parts. The system sends data to the clients according to their privileges in order to reduce the network load. A low-level representation is sent if the client doesn't have the privilege to modify the model, while a richer model is sent if the client does have the ability to edit the model.

In another embodiment, a distributed computer-aided design (CAD) system is provided. In this embodiment, the system provides collaborative functionality, and includes a front-end graphical user interface (GUI), a solid modeler, a constraint solver, and other support libraries. The front-end GUI is located on the client, and is used to obtain user input in the form of geometry, parameters, and constraints. In one embodiment, this input contains 3D information. The client transfers these inputs to the server. The server includes the solid modeler and the constraint solver that receive the input from these clients. The server has the intelligence to process these inputs to generate an exact representation of the three-dimensional (3D) solid shape using the solid modeler and the constraint solver. This output is simplified before it is sent to the clients, because the clients can only display polygons (in one embodiment). The model that is sent to a client is also dependent on the type of client. Some clients can only view the model, while others can perform modifications either on the complete model or on a portion of the model. Thus, the model sent to the clients could include editable and/or non-editable parts. These parts have different representations in the model so that the network load can be minimized. An editable part of the model contain, in one embodiment, the polygonal representation of the part, along with an identification number, so that the approximate model can be mapped to the exact 3D model. Any changes made in this fashion to the exact 3D model on the server can then be approximated again and sent to all of the clients. This embodiment has many benefits. Different users located at distant locations are able to do shape design in a collaborative model. The changes made in the model are passed along to clients in real time. Collaborative creation, modification, saving, and deletion of geometry by the clients is supported. A user is able to apply and modify constraints and dimensions on the geometry. Some users have the privilege to make changes in the design, while others are only able to view the model.

Figure 1B:
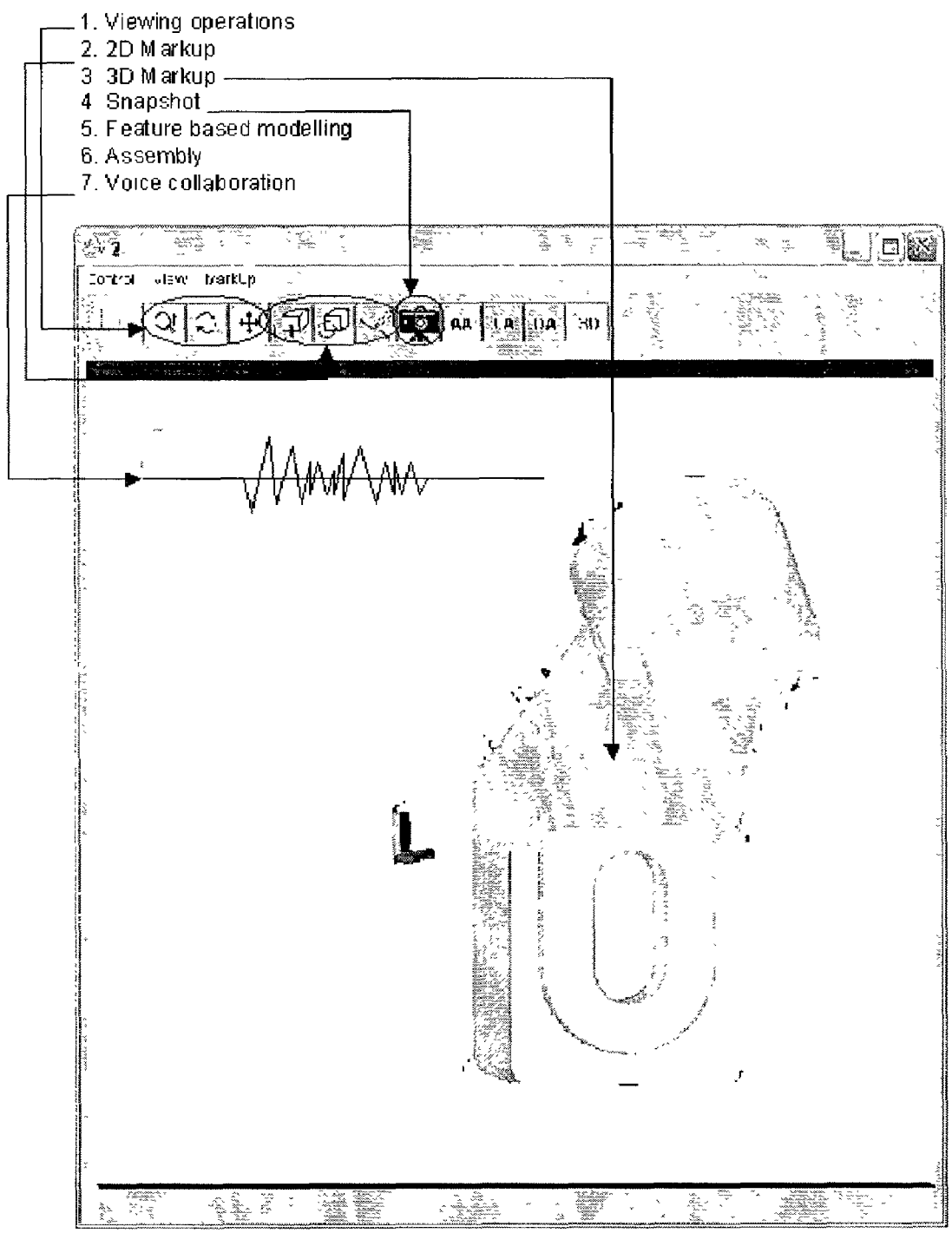
FIG. 1B illustrates a screen display showing a collaborative system, according to one embodiment of the present invention.

FIG. 1A shows a general working architecture of a collaborative system, according to one embodiment of the invention. FIG. 1A shows a number of thin clients and client workstations. At a system level, FIG. 1A shows a collaborative 3D markup and chat channel, a collaborative feature modeling channel, and a collaborative assembly channel each coupled to the central server. A database is also coupled to the central server. Each of the features of 3D markup, feature modeling, and assembly will be further described below (for certain embodiments of the invention). FIG. 1B shows different client side collaboration objects as shown along with a user view, according to one embodiment. FIG. 1B exemplifies a user interface having functionalities for viewing operations, 2D markup, 3D markup, snapshot, feature based modeling, assembly, and voice collaboration.

Figure 2A:
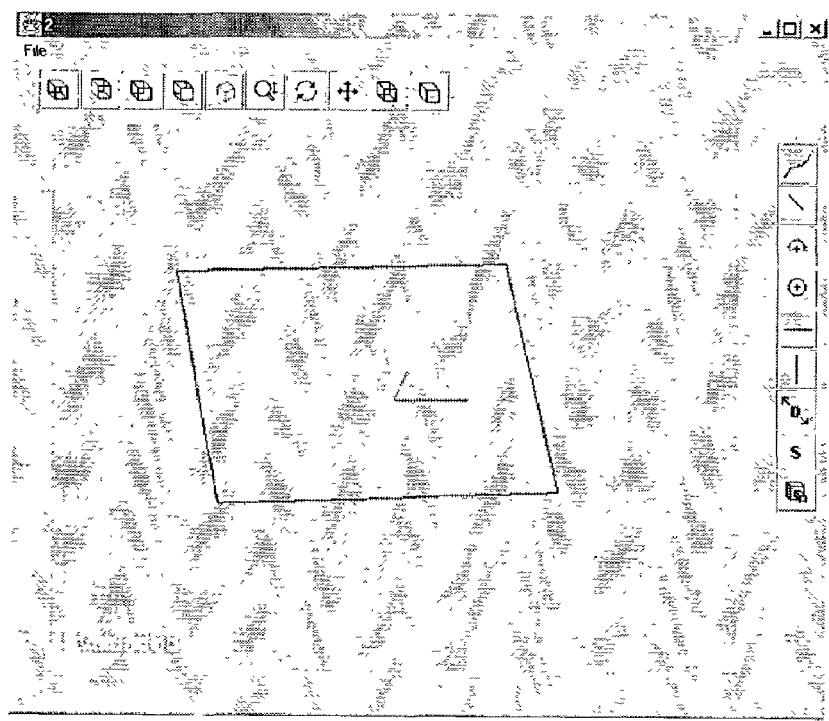
FIG. 2A illustrates a screen display showing geometry inputs generated by a client, according to one embodiment of the present invention.
Figure 2B:
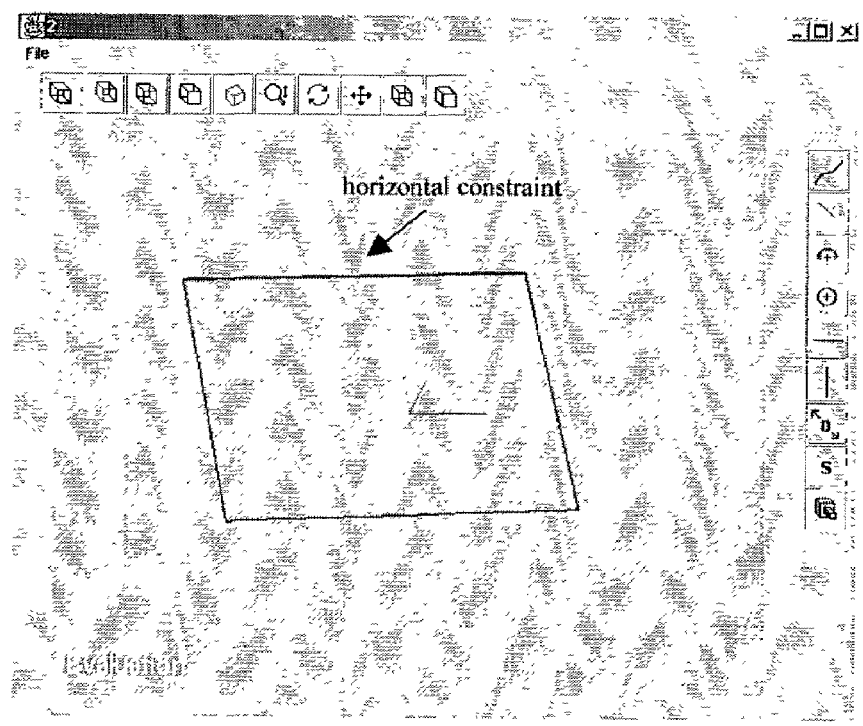
FIG. 2B illustrates a screen display showing a horizontal constraint input generated by a client, according to one embodiment of the present invention.
Figure 2C:
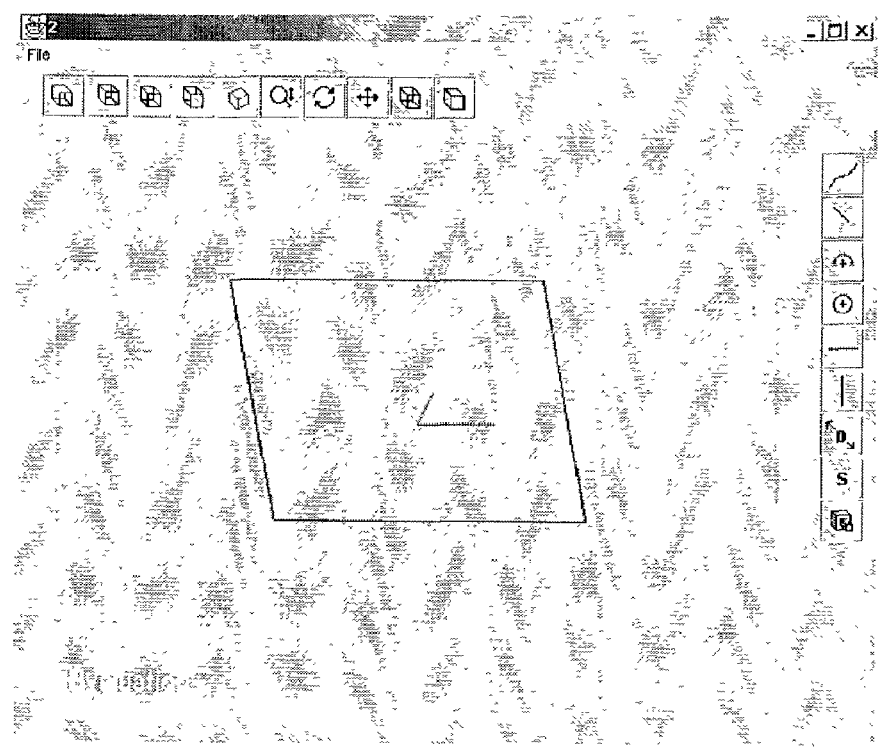
FIG. 2C illustrates a screen display showing a set of solved results as received by a client, according to one embodiment of the present invention.
Figure 2D:
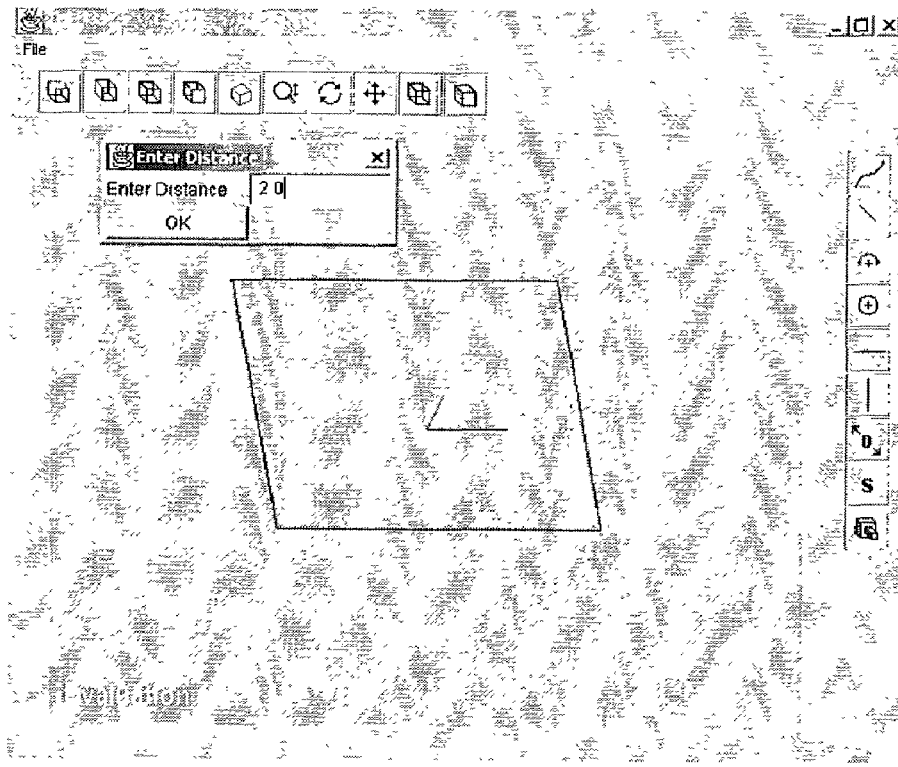
FIG. 2D illustrates a screen display showing an extrusion depth input generated by a client, according to one embodiment of the present invention.
Figure 2E:
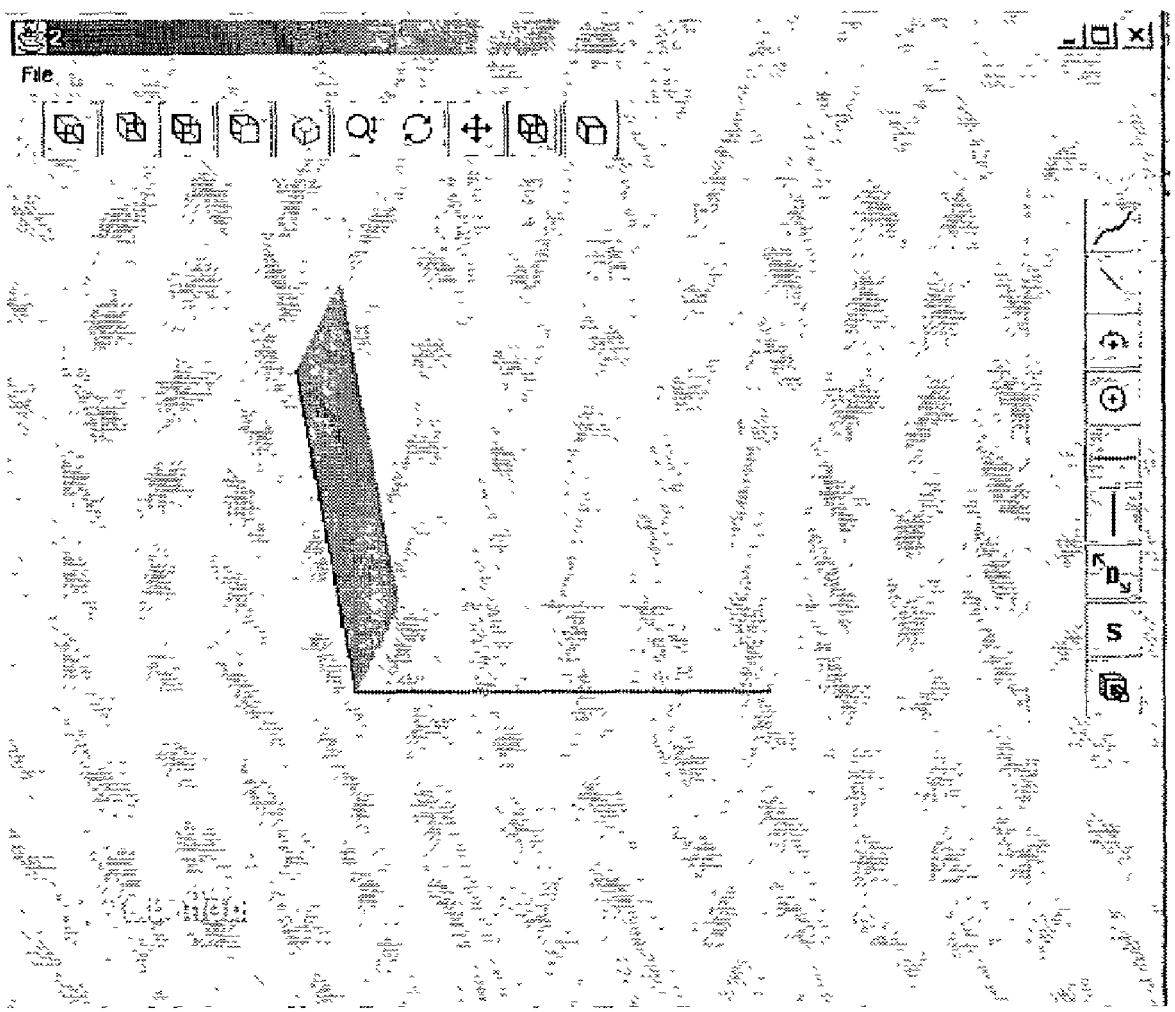
FIG. 2E illustrates a screen display showing a result of a solid modeling operation as received by a client, according to one embodiment of the present invention.
Figure 3:
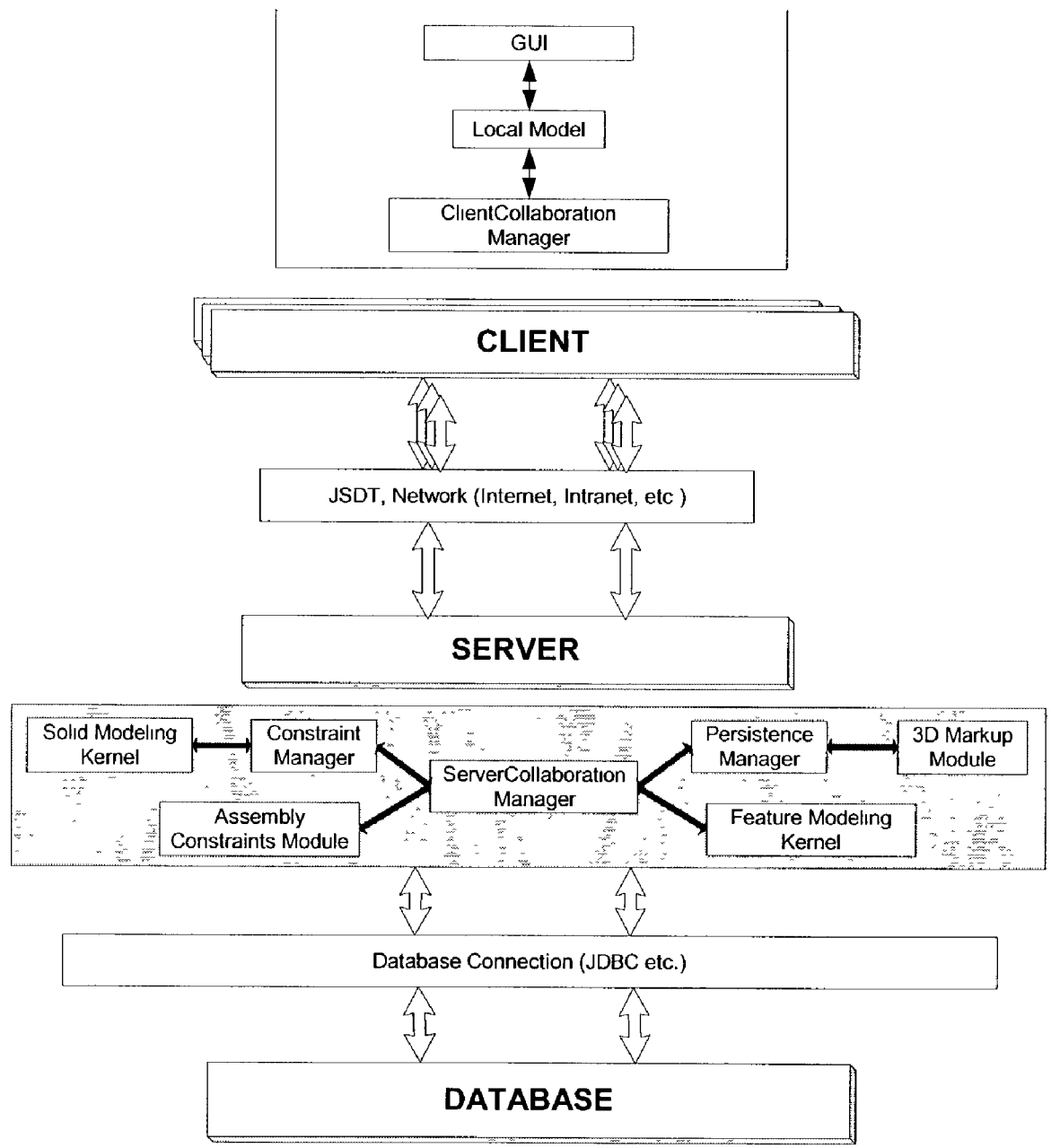
FIG. 3 illustrates a high-level architecture of a collaborative system having a client, server, and database, according to one embodiment of the present invention.

FIG. 2A shows a screen shot of the implemented system, according to one embodiment. The sketch is created on one of the clients and it is sent to the server also at the same time. FIG. 2B shows a horizontal constraint being placed on one of the lines in the sketch. This constraint is also propagated to the server. FIG. 2C shows the solved sketch after the constraints that have been placed on the sketch are solved using the constraint solver on the server. These constraints are first transferred from the client to the server and then they are solved on the server and the result is sent back to the clients. FIG. 2D shows an extrusion depth parameter being created. The sketch will be extruded by this depth value in the direction of positive normal. Once OK button is pressed, this information is sent to the server. The server uses the sketch and the depth to create an exact 3D model. This model is then approximated to a polygonal representation. This representation is sent to the clients. FIG. 2E shows the polygonal model displayed on the client.

Some embodiments allow multiple clients to collaborate in geometry design, feature design, markup in 3D-space, remote collaborative assembly, bitmap and voice. In these embodiments, a Model View Controller (MVC) pattern enables the architecture to centrally manage and coordinate several client applications and operations. Clients provide the input necessary to generate the shape and this information is passed to the server using the Internet. The application server coordinates the operation of collaboration module, assembly module, feature modeler, solid modeling kernel and generates the exact three-dimensional representation of the shape. This representation is converted to an approximate representation, which is then sent to the clients. v3D Markup: This allows the users to markup directly onto the 3D objects and communicates with other clients their concerns in 3 dimensions with greater clarity. Feature based design allows multiple users to construct CAD geometry with predefined features. Assembly allows multiple users to bring their own CAD models into a common assembly space to check assembly related problems. Voice communication allows the users to communicate verbally during any of the collaborative sessions.

In certain embodiments, the clients are able to modify either full or partial parts of the model. These parts are represented differently in the approximate model to reduce the network load. The editable portion has the information to map itself to the exact representation while the non-editable portion has the information only to display the model. Such an architecture allows the client to connect to the original model, and allows collaborative feature-based design, 3D markup on any boundary representation CAD 3D part, assembly of parts owned by different clients in a shared space, and collaboration with voice and bitmaps. In various embodiments, users are able to control the access and hence allow modification of only a portion of the geometry in a part or assembly. These generic objects, including part collaborations, chat text, voice and others, can be associated, stored and retrieved from the server for later re-use in certain embodiments.

There are many advantages of various embodiments of the present invention. For example, the simple and thin structure of the clients connected with a powerful server creates reduced network load. The client doesn't need to have high computational power and many libraries installed. These embodiments put most of the computationally intensive load on the server. Clients provide the necessary inputs for these operations and a server receives these inputs, processes them, generates the output and sends a simplified model to the appropriate clients. These embodiments provide most of the functionality of a standalone CAD system in a collaborative environment. In addition, various embodiments of the invention provide collaborative 3D Markup, collaborative feature based design, collaborative assembly, and voice collaboration. Using the above collaborative modes (in some embodiments), one can communicate accurately by marking on a 3D part collaboratively. This markup is then associated with the original CAD model, stored and retrieved for later reuse. Another example for use in certain embodiments of the invention is use during outsourcing of component design. In these embodiments, the customer can enter into the shared space with a client. The customer and supplier can bring their CAD parts into the shared space. They can jointly review the design for assembly, manufacturability and potential problems, such as clearance or interferences. While this is done, both the supplier and customer do not have to provide their original CAD model to the other. The model that appears in the space only looks like the original model. It does not have the data of the original model on the client side. In some embodiments, voice collaboration can also be associated with a discussion on a design review meeting. Voice can be associated with parts as well. Context and association of information forms a key portion of the architecture, which in many ways converts information into accurate knowledge. Association of the voice chat with the 3D markup occurring concurrently, and further both being associated with the parent assembly or part, converts it into valuable knowledge which can be retrieved later.

Architecture of the System

Figure 5:
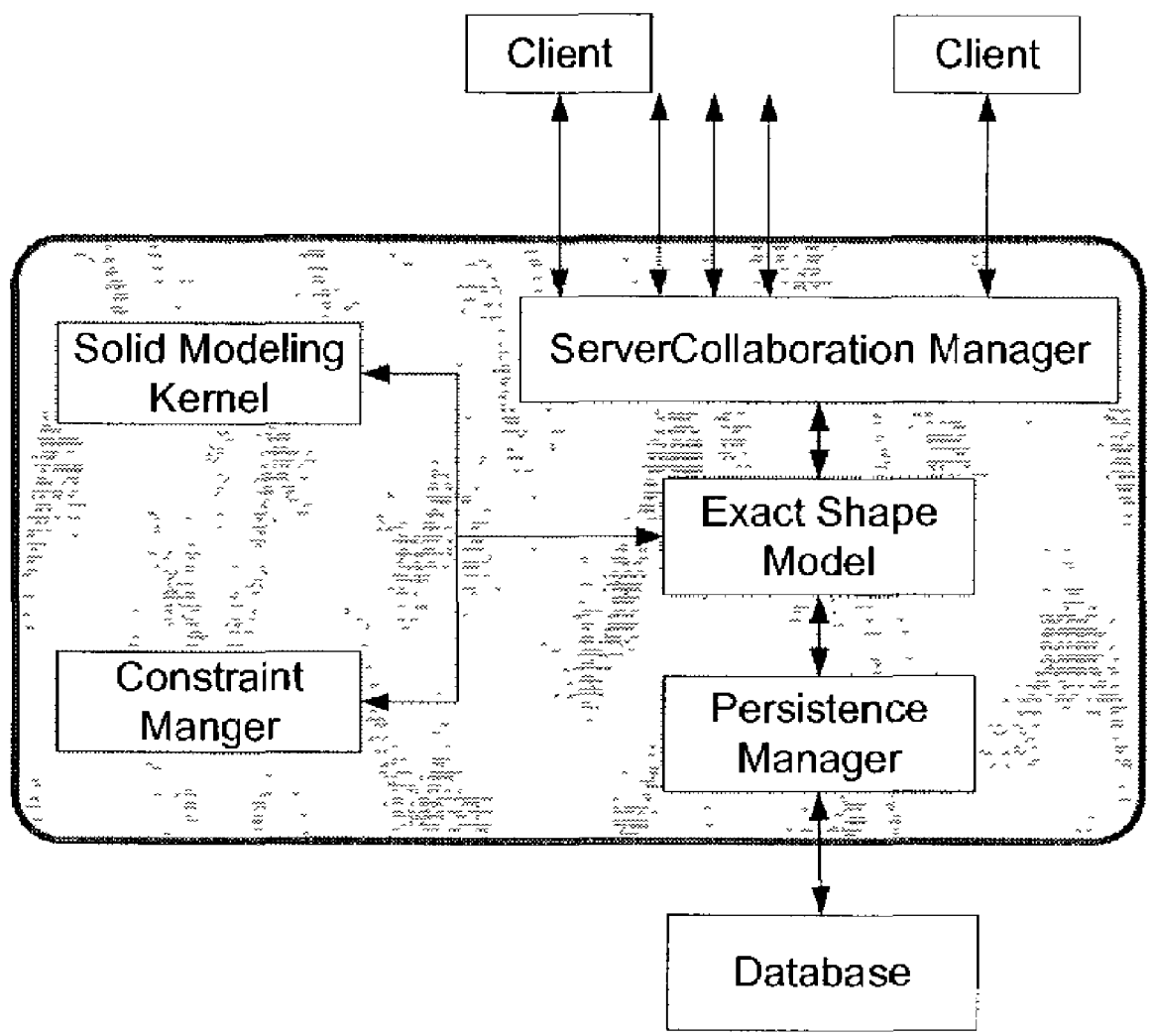
FIG. 5 illustrates a server architecture, according to one embodiment of the present invention.

For achieving collaboration, various embodiments of the invention provide a thin-client approach, where the heavy weight computations exist on the server. Thus the client doesn't require any major installation. In these embodiments, the application server includes the following modules (as shown in FIG. 5): (1) Collaboration Module—this module uses Java classes (in one embodiment) pertaining to share development to manage collaboration, multiple session creation, transfer of editing control and maintaining a master copy of the Model information; (2) Solid Modeling Module—this module uses ACIS solid modeling kernel to perform the tessellation of the CAD model; (3) Constraint Manager Module—this module solves for any constraints within the geometry as specified by the clients; (4) Feature Modeling Module—this module creates and modifies predefined shape features to create part geometry; (5) Assembly Module—this module creates and validates assembly constraints; (6) Persistence Manager Module—this module gives persistence to created parts and assemblies; (7) 3D Markup Module—this module creates 3D Markups on the part geometry; (8) Streaming Module—this module streams assembly subcomponents incrementally; (9) Database Module—this module provides a layer between the server and the database that provides an interface to save and retrieve data from the database; (10) JNI Module—This module provides a bridge between Java and C++ components; (11) Voice chat module—This module streams voice chats between users.

Figure 4:
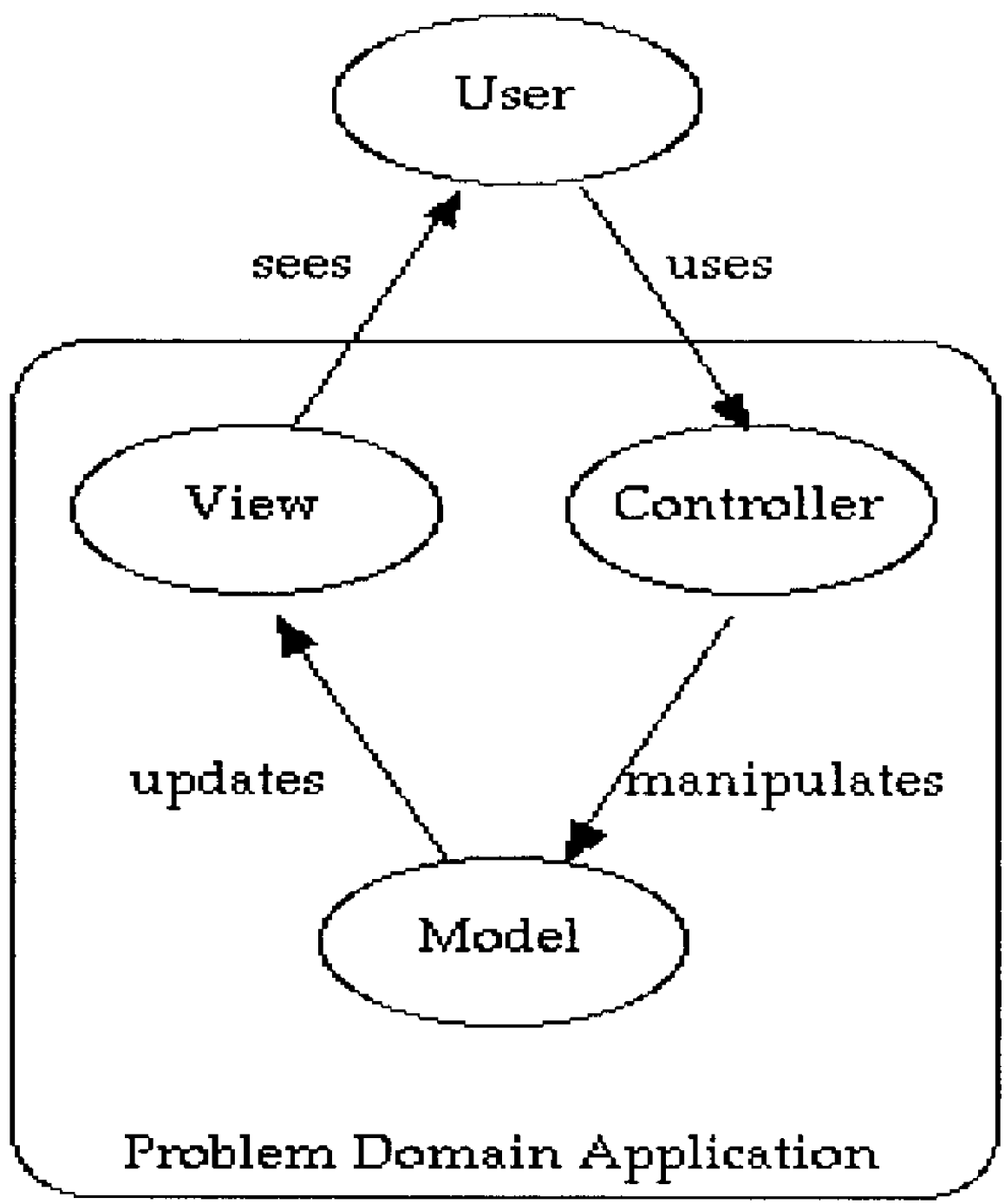
FIG. 4 illustrates a Model View Controller (MVC) architecture, according to one embodiment of the present invention.

In one embodiment, a Java application is used on the client end. The Model/View/Controller (MVC) triad of classes is used to build the user interface (as shown in FIG. 4). The "Model" is the application object (the Geometry object in this case). It contains the details of the product being created. The "View" is the screen representation of the Model. Magician library used to display the faceted CAD objects with their corresponding relative transformations (in one embodiment). The "Controller" is the way the user interface reacts to the user input. The Magician library used to capture the user input like picking, dragging, etc. (in one embodiment).

In one embodiment, the Client-Dispatcher-Server-Receiver design pattern along with the Command design pattern is used to enable collaboration. This also makes collaboration transparent to the clients.

Server-Side

In some embodiments, the server provides support for most of the core computational operations, such solid modeling and constraint solving (as shown in FIG. 5). The server is the hub where data from all the clients comes in and is sent back to the clients after processing. The server has the master CAD model that is used to update the approximate version of the shape model on the clients. The solid modeling kernel and Constraint Manager provide support to generate the master CAD model and solve for any constraints within the geometry as specified by the clients. The Collaboration Module maintains a reference to every client that is connected to the server and this reference is used to send and receive commands and data from the clients.

In one embodiment, the Collaboration Module receives a Command object if a client requests a connection to the server. The collaboration module processes this object and adds a reference of the client to its list of clients. Once connected, the client can send geometry, constraints, and other information to the server in order to generate a CAD model or collaborate in other modes with clients.

In one embodiment, the Constraint Manager is used to solve for the constraints imposed on the geometries by the clients. Some examples of constraints are: horizontal, vertical, length, and parallelism. The Constraint Manager stores all the constraints and the corresponding geometry/geometries as the server receives them. The Constraint Manager solves for these constraints if there is a request from one of the clients. Once solved, the updated geometry is sent to the clients. The Constraint Manager can solve for both under-constrained and well-constrained system of constraint equations. The Persistence Manager takes care of storing data in the database. The solid modeling kernel is needed to create three-dimensional representation of the shape model from the inputs as given by the clients.

Client-Side

In some embodiments, the client structure is based on the Model/View/Controller (MVC) pattern as shown in FIG. 4. Model (M) is the application object or the data, View (V) is its screen presentation, and Controller (C) defines the way the user interface reacts to user input. MVC decouples the components to increase flexibility and reuse.

In one embodiment, the Model class represents the Model in the MVC pattern. Model holds all the application data. In case of CAS it holds the Geometry and assembly information. In the MVC pattern there is a View registered with the model using the registerView( ) interface. The Model in turn is registered with the controller via the registerModel( ) interface. The View and Controller exist only on the client ends; there is no GUI on the server side. The ClientViewerFrame class acts as a pure Controller and manages the JFrame and the toolbar. Using the buttons on the toolbar the user is able to switch between the various states of the application like zooming, assembly, rotation etc.

In one embodiment, the ClientViewerWindow acts as both a Controller and View.

ClientViewerWindow uses the Opengl libraries via Magician to display the Model information. Using Magician functionality the user interaction, such as the mouse motion on the screen is also captured. The user typically using the controller, in our case either ClientViewerFrame or ClientViewerWindow, supplies the input. This input potentially causes a change in the Model data via the Application Program Interfaces (API's) exposed in the ModelInterface. When the Model finds that its data has been changed using the controller it triggers the updateView( ) function in the ClientViewerWindow via its updateViews( ) function.

In one embodiment, the Model holds reference to the Product class that is being created. The Product contains the geometry and the non-geometry information pertaining to the object being created. The ClientViewerWindow function handles the display and the user interaction with the GLComponent. The display( ) function fetches the Geometry class for each of the Product active in the system and draws them as a collection of triangles (Facets).

In one embodiment, the different states of the system like zooming, panning, selection of faces are handled by the classes ZoomTool, PickFaceTool, RotateTool, etc. all of which are derived from the class Tool. This is in accordance with the State Pattern. This allows us to abstract the logic for these states in their respective classes. The PickFaceTool is responsible for handling the picking of the faces and it achieves that by pushing names for each of the faces. The names used are decided based on both the index of the child and the face. This helps us to get back to the exact child and its Face when Opengl returns us the number of the picked face.

Server

In some embodiments, the ServerBroker class is the backbone of the collaboration system. ServerBroker receives commands from the clients and applies those commands to the master Model on the server. ServerBroker also handles the synchronization of the clients, by updating the other clients the changes. It implements the ModelInterface and the ControllerInterface.

In one embodiment, the solid modeling functionalities are accessed via the interface, InterfaceToSolidModeler. This layer of abstraction is provided to make the system independent of the solid modeler. In one embodiment, ACIS is used. In other embodiments, other solid modelers, such as Parasolids, are used.

In one embodiment, the class InterfaceToAcisModeler implements the InterfaceToSolidModeler using the ACIS solid modeler. In one embodiment, ACIS and the Java Native Interface (JNI) are used to communicate between the Java and the C++ worlds. When a request for faceting a file is received on the server it is passed on to the C++ layer through JNI. On the C++ end the CAD file is read in, tessellated and returned back the java FacetData object.

Collaboration

In some embodiments, collaboration is handled using Java Shared Data Toolkit (JSDT). The Client-Dispatcher-Server-Receiver pattern is used to achieve the synchronization of the clients.

In one embodiment, the Command pattern is used in order to encapsulate the executions of the command. In JSDT communication between the clients occurs in form of serialized java objects. The commands are passed from the clients to the server and back in form of Command objects. There are two types of Command objects ones that implement the ModelCommandInterface interface and ones that implement the ControllerCommandInterface interface.

Figure 6:
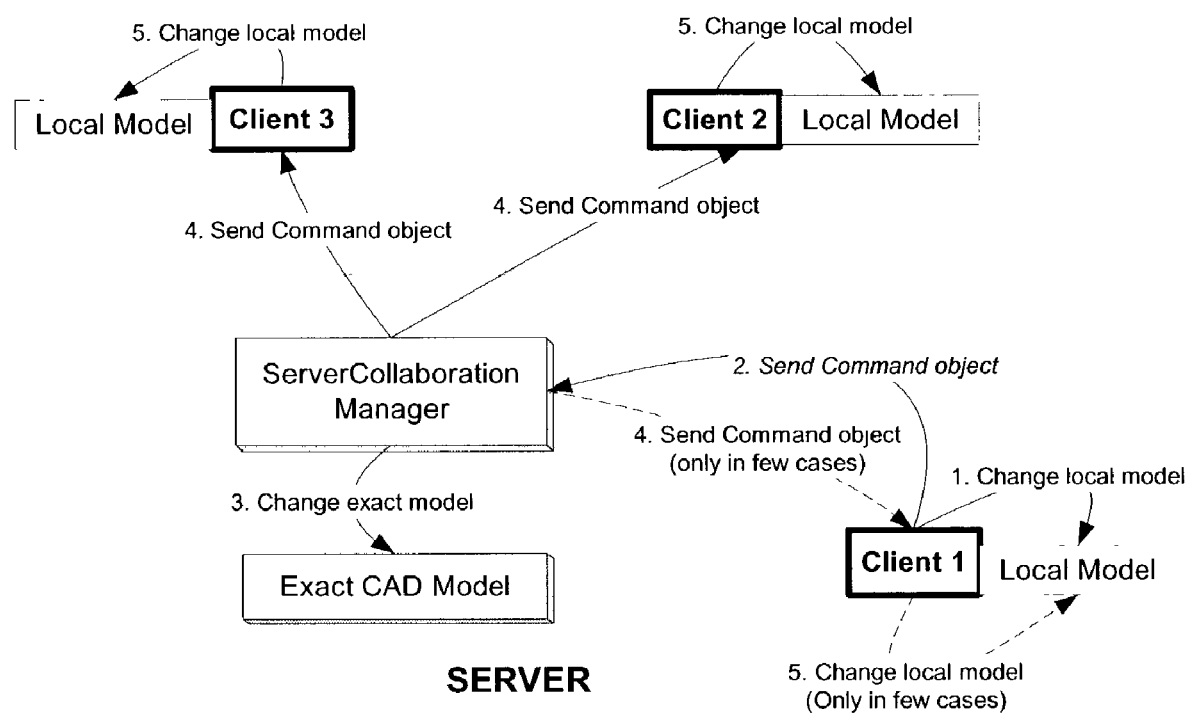
FIG. 6 illustrates a series of synchronization operations, according to one embodiment of the present invention.

In one embodiment, the client includes a ClientDispatcher class that is responsible for forwarding the changes made via the GUI to the local model to the server (ServerBroker). This class implements the ModelInterface, but differs from the Model class in that its only purpose is to create appropriate Command objects and dispatch them to the ServerBroker. The Command object stores all the arguments required for the corresponding method and is sent to the server, when the method is called on the client, using the communication layer between the server and the clients. As the server receives the Command object sent from one of the clients, it makes the same changes in the master CAD model. The server then sends either this or a new Command object to either rest of the clients or to all clients so that all clients and the server can be synchronized. If the operation corresponding to the Command object is to generate the solid then the server sends a new Command object containing the approximate faceted model to all of the clients. Otherwise the same Command object is sent to rest of the clients. FIG. 6 shows how this process of synchronization works (according to one embodiment).

On the client end the ClientReceiver class receives the Command object, calls the executes method on it (according to one embodiment). This results in the appropriate method of the ModelInterface or ControllerInterface being executed. Thus the Model on the other clients is also synchronized.

Session Management

Figure 7:
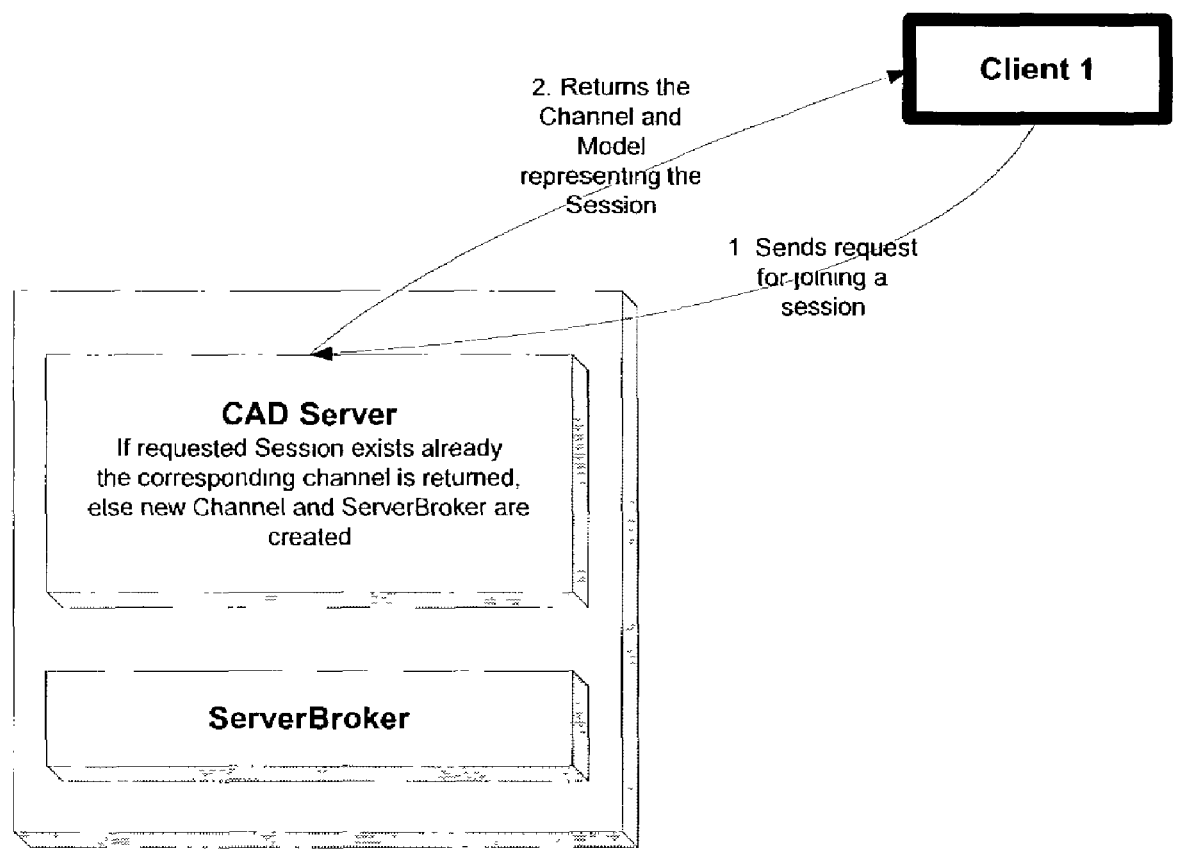
FIG. 7 illustrates session management flow, according to one embodiment of the present invention.

In some embodiments, session management is achieved primarily by making use of JSDT's concept of Session and Channel (as shown in FIG. 7). Clients when connecting to a session can choose the Channel that they would be using. The Channels are made use of to support the idea of session. While connecting the client specifies the group to join as an input parameter. This request is sent to the Server and if the group doesn't exist already, a Channel for that group is created and returned to the Client. On the other hand if there are other clients connected to that group already the server returns him the Channel corresponding to that Group. While connecting the Client is sent a copy of the master Model on the Server. This enables the Clients to login into a Group at anytime and still be ensured that they would be in synchronization with the other participants in the Group. Synchronization is managed in the ServerBroker class.

3D Markup

Figure 8:
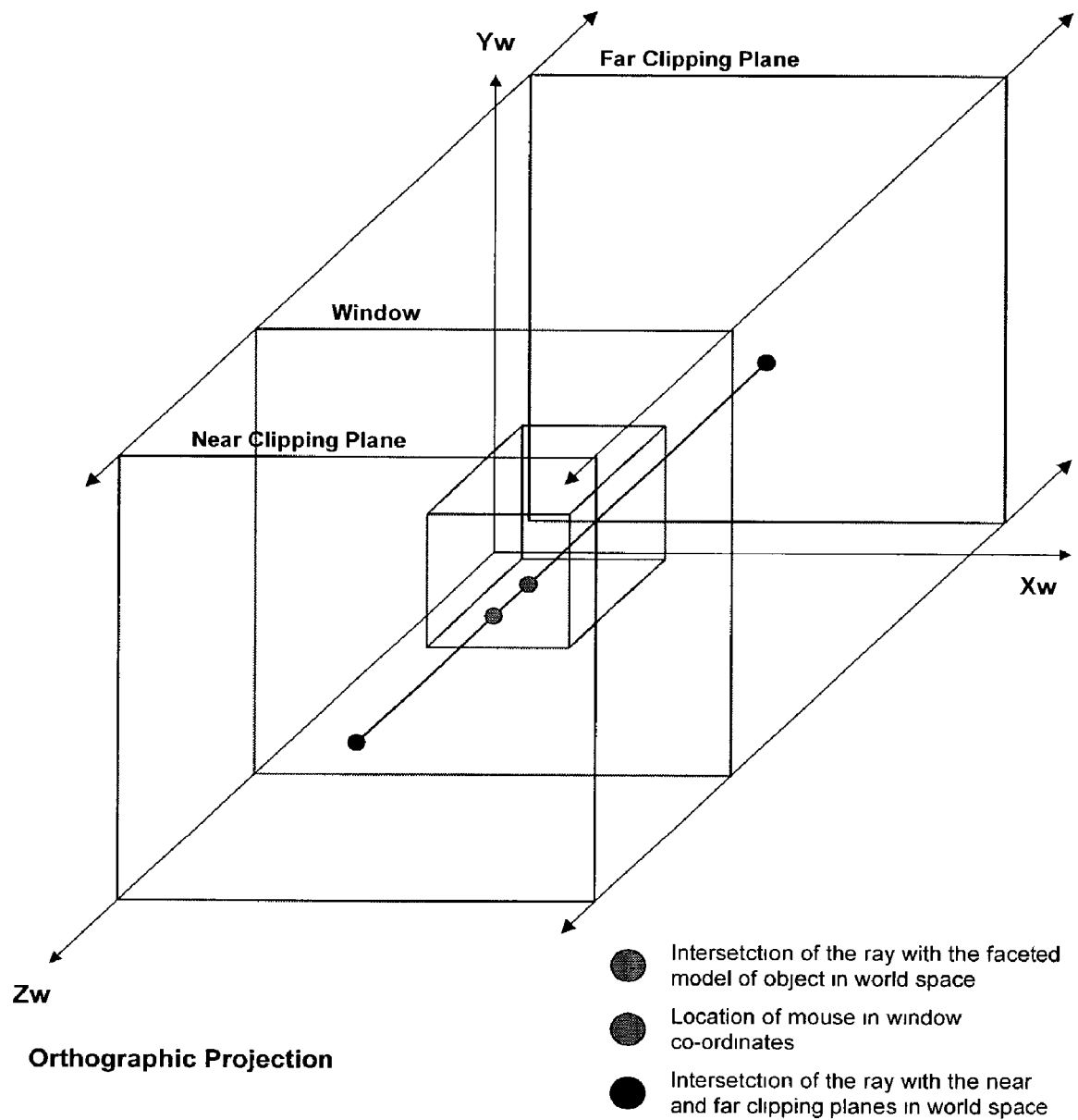
FIG. 8 illustrates a ray cast diagram for three-dimensional (3D) markup, according to one embodiment of the present invention.

Certain embodiments of the invention use an architecture for collaboration that is related to a web based viewing and mark-up method that enables drawing directly on the 3D data. Sketching is carried out directly on the 3D faceted representation of the model. The models that can be worked on are imported directly by the "Solid Modeling Kernel". The intersection point(s) obtained by the intersection of the ray cast from the pixel location in the view port to nearest facet of the 3D model is (are) stored as a vector in the facet data as showing in FIG. 8. Multiple such mark-ups can be viewed simultaneously.

One advantage that these embodiments offer over conventional mark-up is that the mark-up can be viewed in 3D to represent actual 3D artifacts such as a 'parting line on a mold component'. This enables the mark-up to remain valid from any view direction unlike 2D mark-up where the 2D mark-up is relevant only from one particular view direction. Another advantage is that it enables the mark-up to be saved and retrieved for later use.

Figure 9:
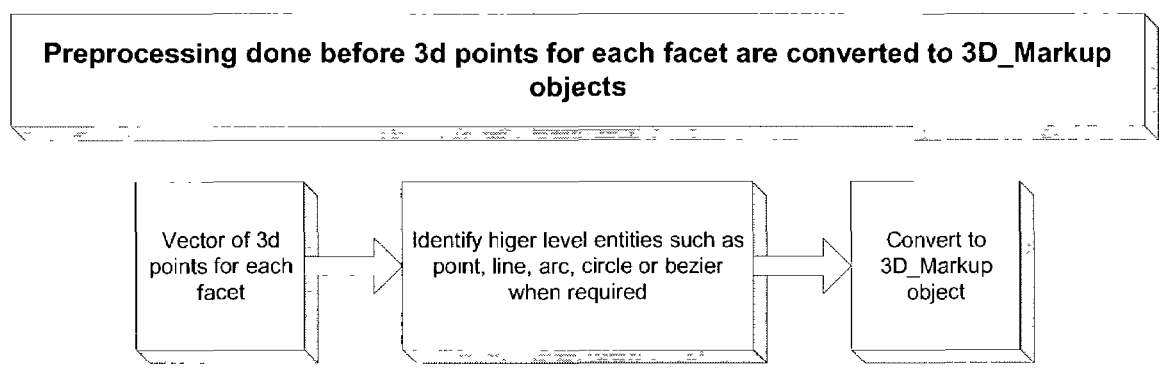
FIG. 9 illustrates a preprocessing stage for 3D markup, according to one embodiment of the present invention.
Figure 10:
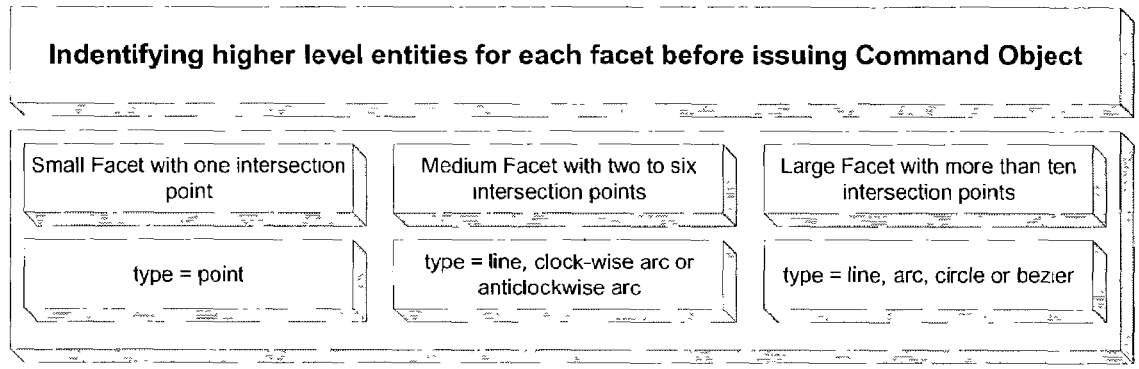
FIG. 10 illustrates processing 3D markup points, according to one embodiment of the present invention.
Figure 11:
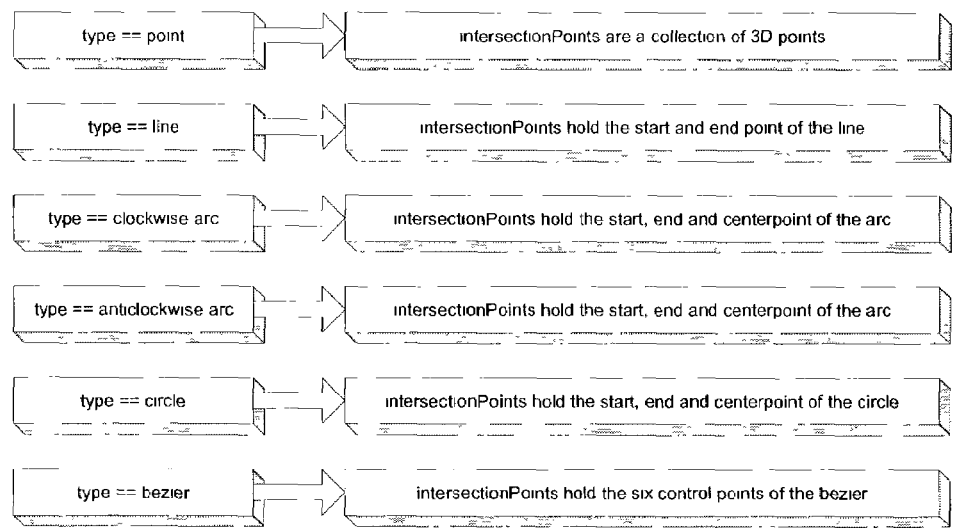
FIG. 11. illustrates vector interpretation for 3D markup, according to one embodiment of the present invention.
Figure 12:
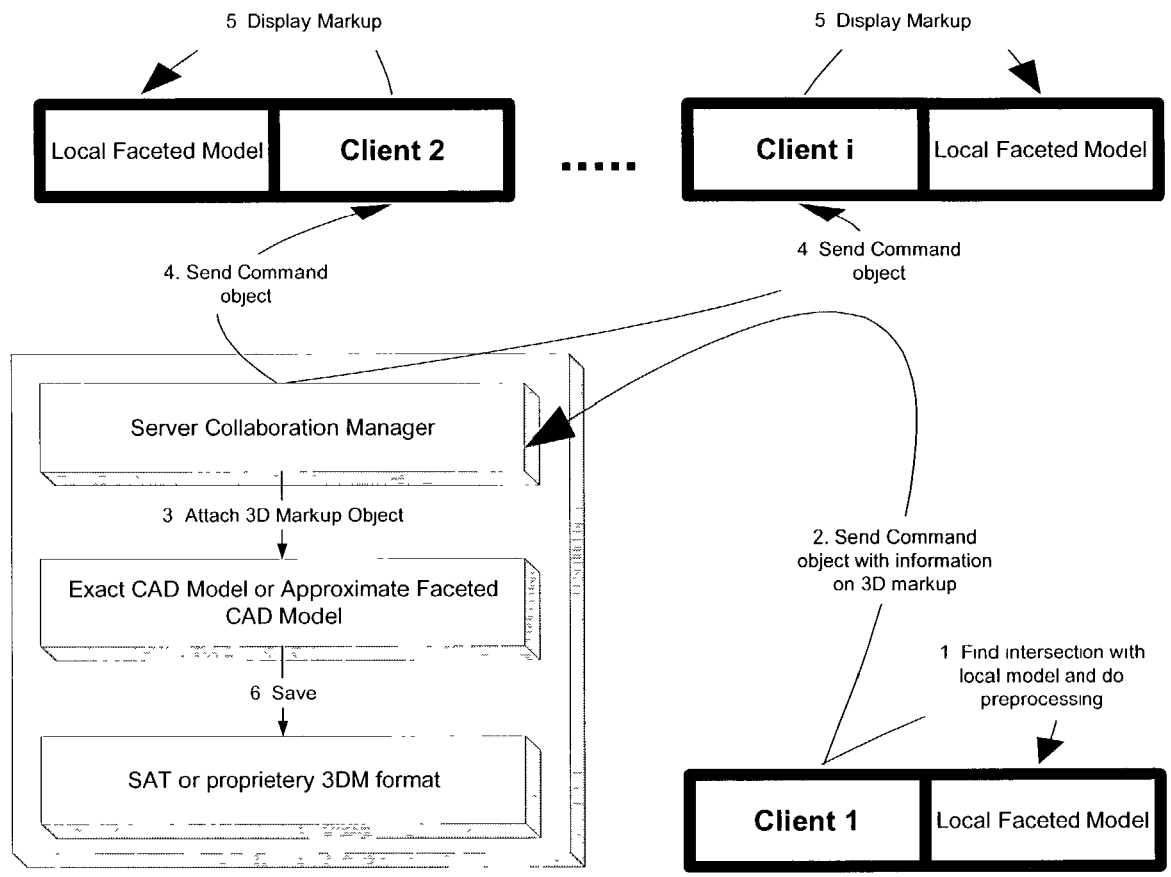
FIG. 12 illustrates a synchronization process for 3D markup, according to one embodiment of the present invention.
Figure 13:
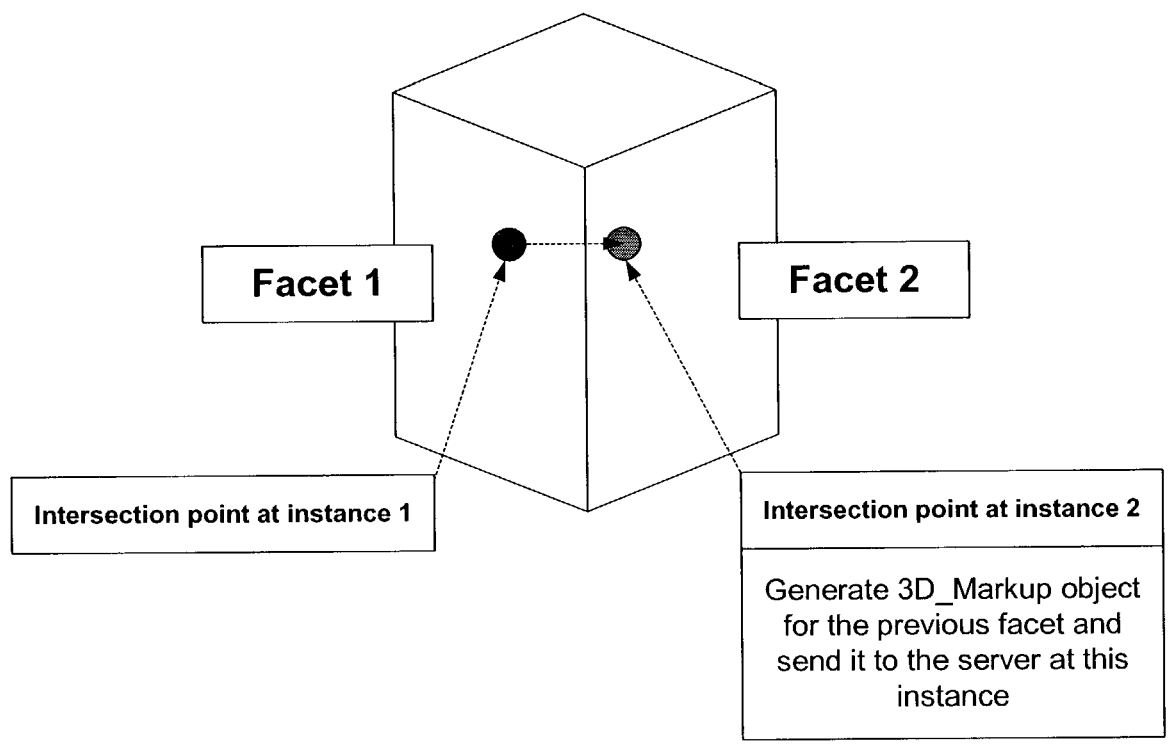
FIG. 13 illustrates processing of a 3D markup object, according to one embodiment of the present invention.

When the mouse is dragged in the 3D markup mode, the rays cast from the window co-ordinates (at the client end) into the world space will give the intersection points with the facets in 3D. These points form the sequence for 3D markup. The sequence of points can be processed further, as show in FIG. 9 thru FIG. 11. The 3D points are transferred to the server and other clients as '3D_Markup' objects as shown in FIG. 12. The '3D_Markup' object is generated after the ray moves from one facet to another as shown in FIG. 13.

Figure 14A:
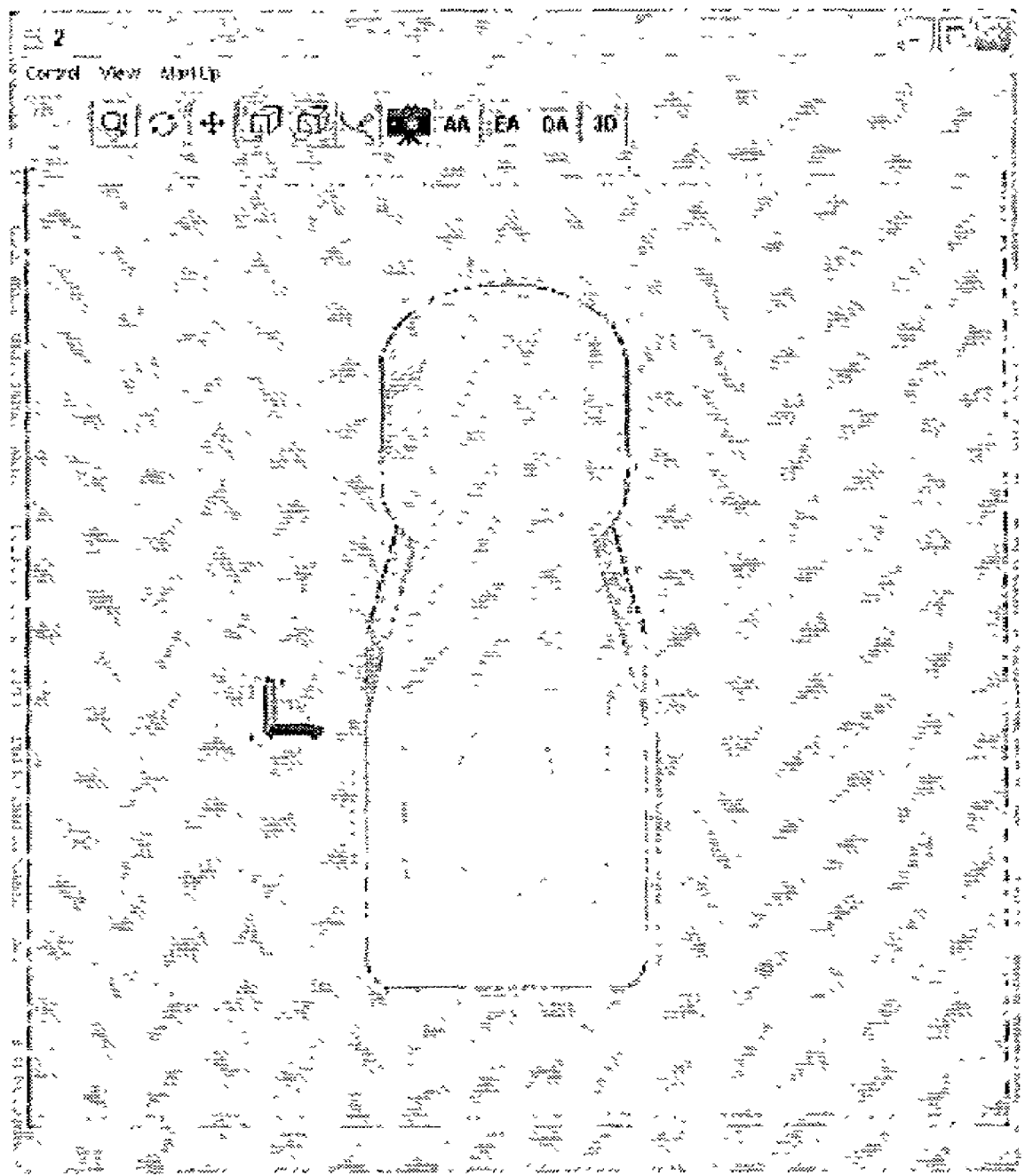
FIG. 14A illustrates a screen display showing an unmarked 3D object, according to one embodiment of the present invention.
Figure 14B:
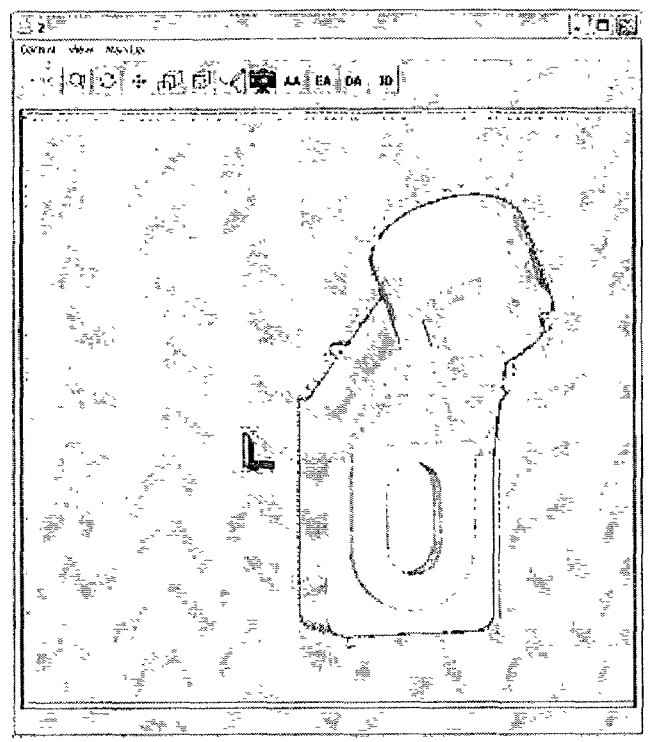
FIG. 14B illustrates a screen display showing a marked up object in 3D, according to one embodiment of the present invention.
Figure 14C:
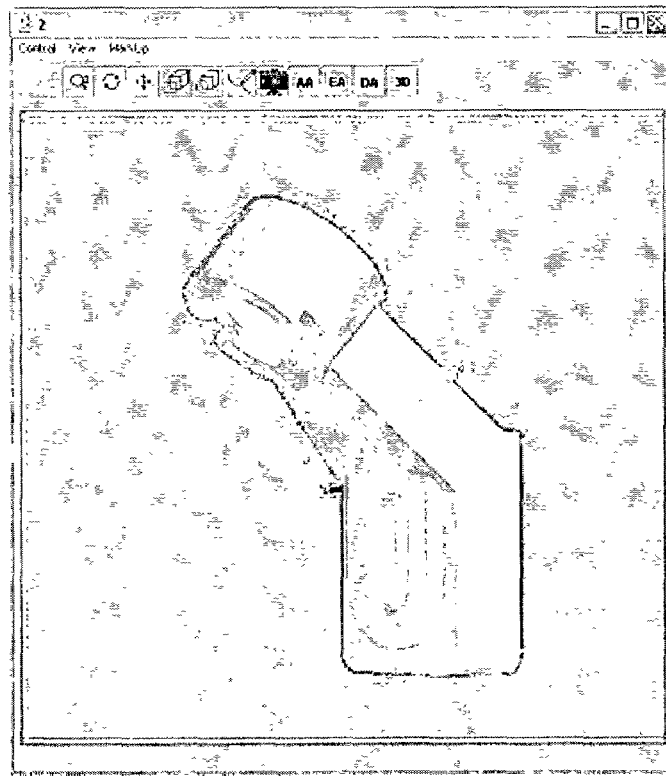
FIG. 14C illustrates a screen display showing a marked up object in 3D from a different view, according to one embodiment of the present invention.

In one embodiment of the invention, the process of 3D markup is as follows. 1) Once the server is up and running the clients can join an existing session or create a new session by specifying the session name. 2) The Client is now presented with the current view of the session he/she has logged into. In case the viewing session has been in progress, the user gets to see the current object in the system or if there have been no action so far he sees a blank screen. 3) If creating a session, the client is set as the Master client and he/she has the 3D Markup control. Otherwise the user is set as the Slave-client with only view manipulation controls. In one embodiment, the Assembly Controls are all disabled. 4) The user begins the 3D markup operation by choosing the 3D Markup Tool, by clicking on the "3D" button on the toolbar. The user then proceeds by pointing at the desired location on the model that is under discussion. When the mouse is dragged, the 3D markup appears along the positions pointed by the mouse while dragging the same as shown in FIGS. 14A thru 14C. A new markup is created between each mouse pressed and mouse released events.

Figure 15A:
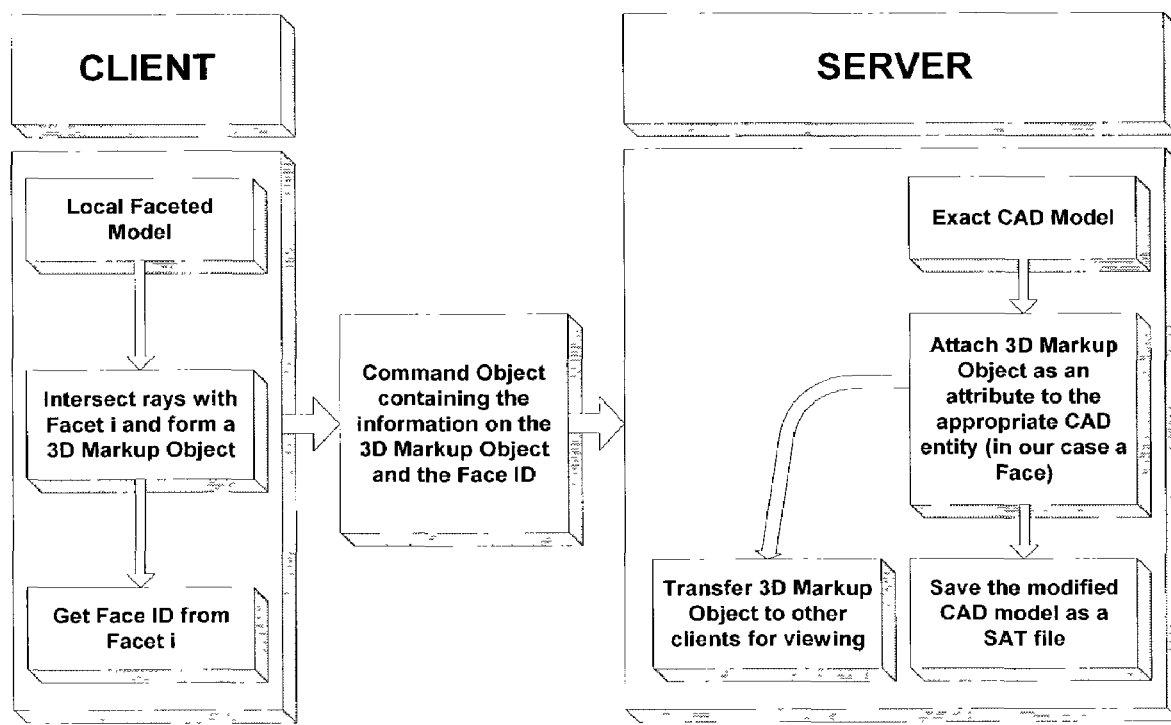
FIG. 15A illustrates a method for saving an exact computer-aided design (CAD) model with a 3D markup object, according to one embodiment of the present invention.
Figure 15B:
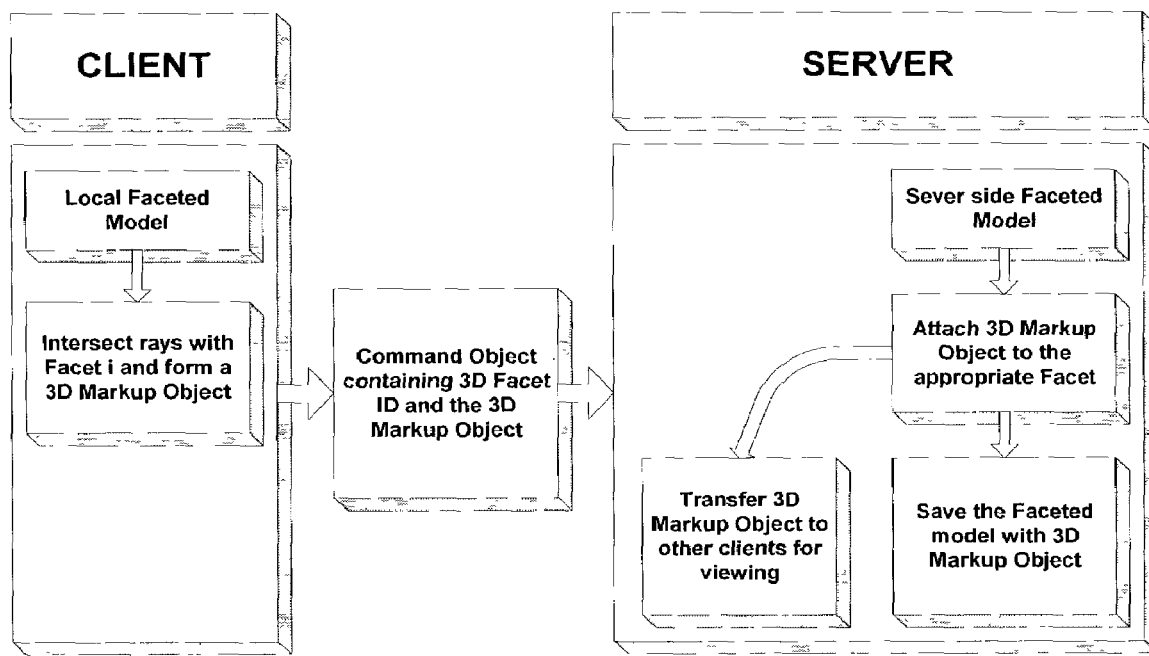
FIG. 15B illustrates a method for saving a faceted model with a 3D markup object, according to one embodiment of the present invention.

FIGS. 15A and 15B illustrate two methods of obtaining, transferring and saving the 3D markup points, according to one embodiment.

Feature Modeling

Certain embodiments of the current invention are related to a web based geometry creation method that enables creating models directly without downloading or using CAD packages installed on the client machine. Shape creation can be done from scratch or existing models can also be used as base features. The model is imported directly by the "Solid Modeling Kernel" residing at the server end. In these embodiments, the user does not need to have any solid modeler on his computer. The model at the server will hold the vector of used features whereas the model at client end will hold partial representation of the features. These two models have one-to-one mapping between entities. If client edits any of the features on local machine (using this mapping), the change is sent to server and the server model is changed. Then the changed model will be sent back to all the clients. While editing the features the user will be able to see the change he is trying to make however actual change is implemented at server side model. If this file is saved all the information about these features will be saved locally in a file and that file can be retrieved in future and then worked on.

In order to start creating the model, the user will insert a base feature in the workspace (according to some embodiments). For example, the user can create a block feature, which will act as a stock for creating the solid model. The GUI is of a drag and drop type, so that user can just drag features and drop them into workspace. After inserting a base feature, the user can go on modeling the shape by inserting any number of available features into the base feature until he/she gets the final desired shape. The user can interactively change sizes of features or drag the features around by selecting the desired feature and dragging the displayed handles on the faces of selected feature. Each feature keeps the track of the number of features it is associated with. Thus, whenever a feature is changed, all respective features will change their shapes to accommodate the change. Along with these features, there is a simple implementation of copy and paste operations for shape features. The user can copy and paste the features anywhere on the model. Additionally, a user can choose to save the model in a .CFS file (in one embodiment), which is a native file format. When user saves the model, it is saved with all shape feature information and can be retrieved in the future for further work.

Figure 16:
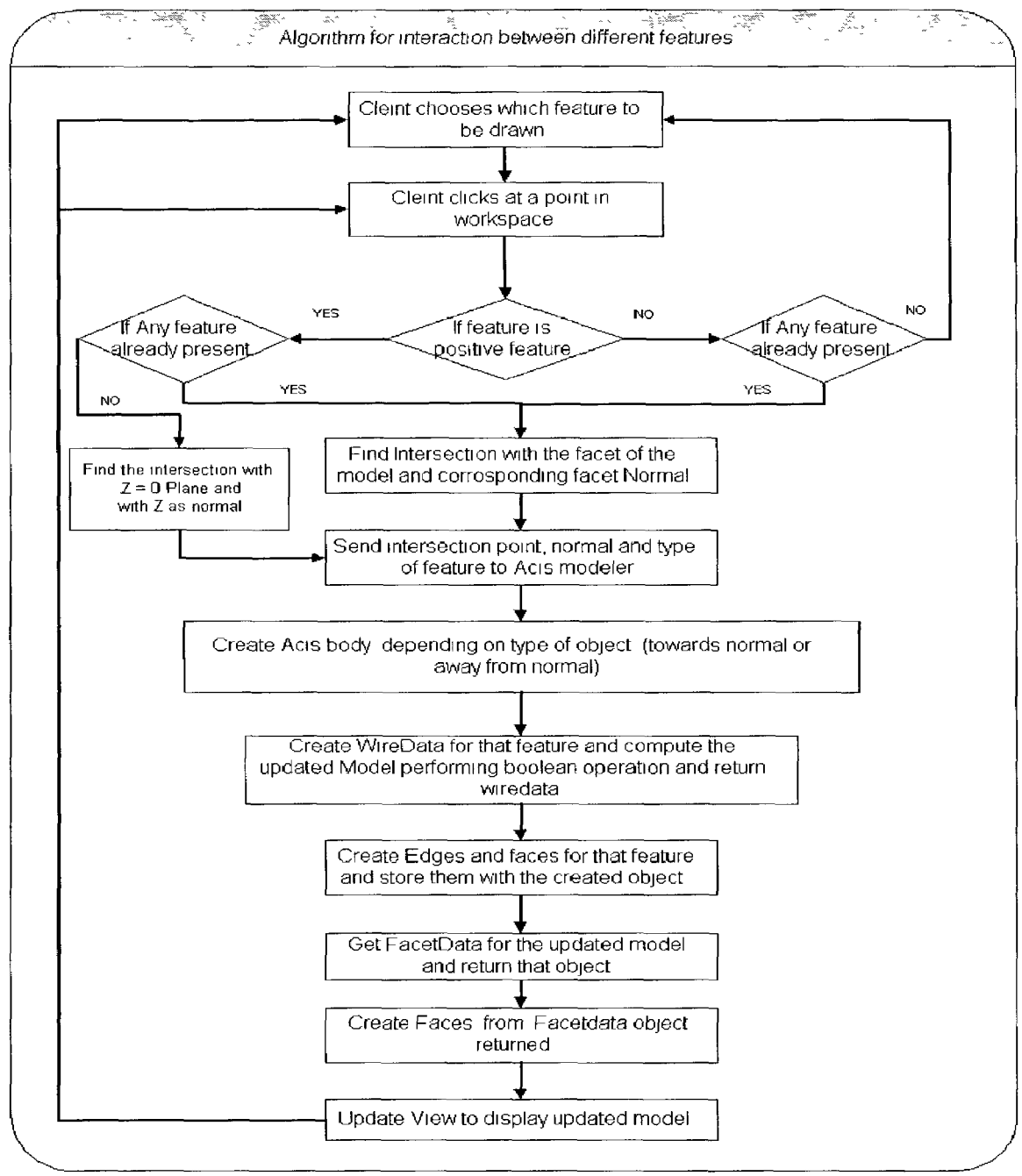
FIG. 16 illustrates a feature modeling algorithm, according to one embodiment of the present invention.

The process of modeling (according to one embodiment of the invention) is as follows (as shown in FIG. 16). (1)The user in the session starts by creating a base feature using one of the shape features available or user uploads some already created model. This model could have been created using feature modeler described here or most of the other commercially available CAD systems. This model can be used as a base feature. (2) There can be more than one client taking part in the modeling. However only one client is allowed to interact with the model. The Master Client with the modeling control drags and drops the next feature in the workspace. If the feature interaction is valid then command object is sent to server with certain variables asking it to carry out the necessary modeling operation. (3) The server will create new instance of the feature and send abstracted b-rep model through another command object to all clients in that session. This model includes a wire frame representation of the feature. As soon as client receives this b-rep representation of feature, automatically manipulation handles are created so that user can manipulate the feature. These handles are stored locally and server doesn't know about these handles. (4) At the same time, master model at server is changed in order to incorporate the new feature and this new model is sent back to all clients. Clients receive new model and display it on the screen. (5) Similarly, other operations such as manipulating feature size, location and orientation, can be performed following the process.

In one embodiment, the model file created by the user is stored in proprietary format (.CFS) in the database along with the other project related details. The .CFS file has all information regarding the shape features used in modeling. This guarantees the no loss of feature data in future retrieval of the file.

These embodiments provide many novel features. For example, these embodiments provide a thin client implementation, meaning that not all of the data is stored locally on client side and computationally intensive operations are carried out at server end. However, the user interaction gives the feel of standalone system. The Graphical User Interface is very simple to use. And, embodiments of the system are much more flexible in the sense that it can work on any other CAD model made in other commercial systems.

Figure 17:
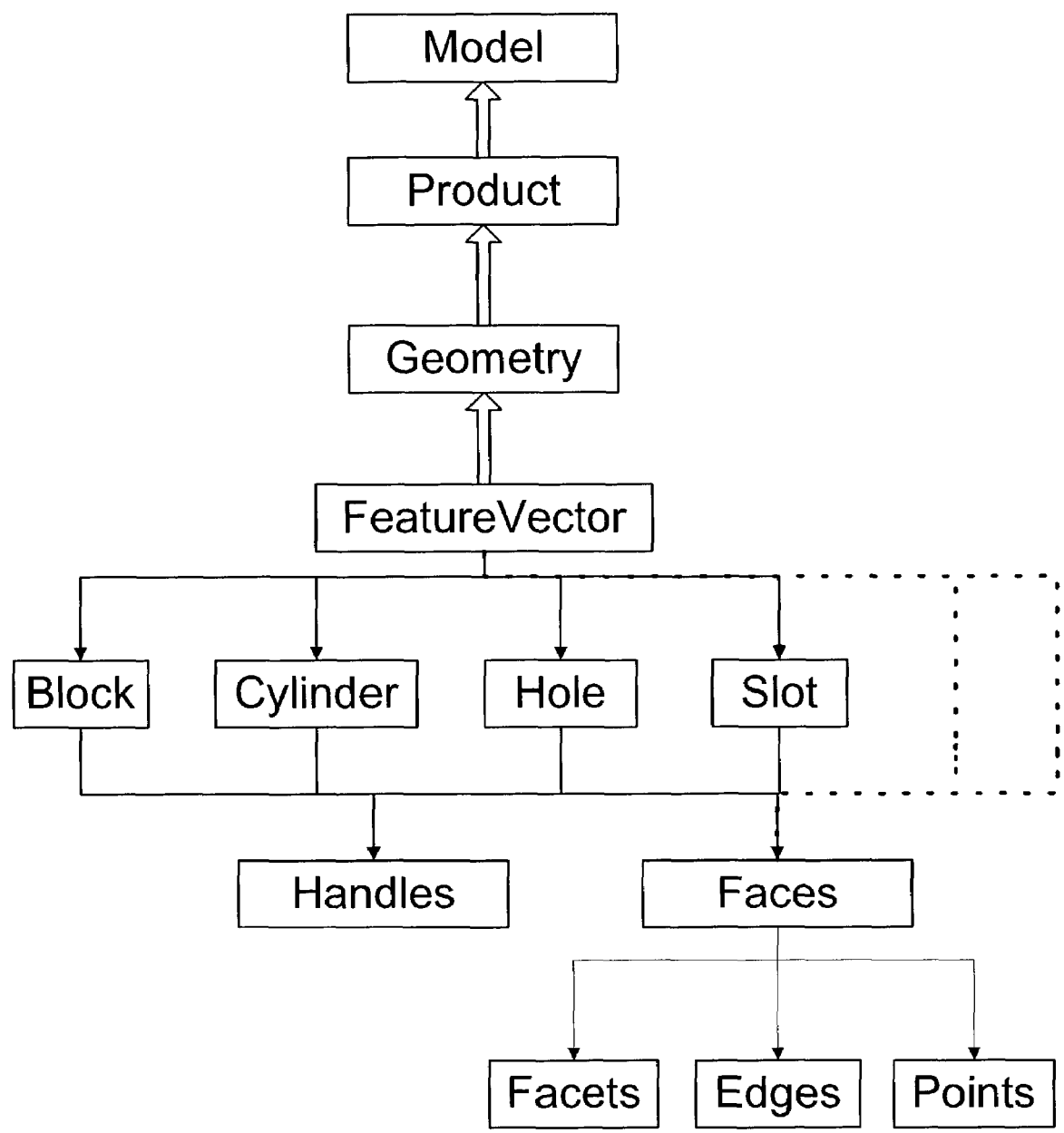
FIG. 17 illustrates a feature modeling data structure, according to one embodiment of the present invention.

FIG. 17 illustrates certain architectural features for some embodiments of the invention. There are different classes representing different features. New instance of each feature are created each time the user inserts a feature into the model. The object of Geometry class will hold the vector of these features with itself so that features can be later on processed and manipulated. The access to these features is through Model->Product->Geometry->Feature vector.

Assembly

Some embodiments of the current invention are related to an assembly creation method that enables assembly operations directly without downloading or using CAD packages installed on the client machine. Using the assembly module the clients can first import the CAD files of the subcomponents they have uploaded into the server earlier. They can then collaborate and specify the assembly constraints. The transformations computed are communicated to other clients in the session in the form of Command Objects. Thus the architecture, which enables passing of Command Objects, is utilized to provide distributed assembly while maintaining a thin client.

In one embodiment, the following are the assembly constraints the users can choose from: (1) Mate—Two planar surfaces or datum become coplanar and face in opposite directions; and Align—This can be applied to planar surfaces datums, revolved surfaces and axes. Planar surfaces become coplanar and face in the same direction. When Align is used on revolved surfaces or axes, they become coaxial.

In one embodiment, the process of assembly is as follows. 1) Once the server is up and running the clients can join an existing session or create a new session by specifying the session name. 2) The Client is now presented with the current view of the session he has logged into. In case the assembly session has been in progress, he gets to see the current objects in the system or if there have been no action so far he sees a blank screen. 3) The Client if he is creating a session is set as the Master client and he has the Assembly control. Otherwise he is set as the Slave-client with only view manipulation controls. In one embodiment, all the Assembly Controls are disabled. 4) The user then proceeds to import the files he is interested in assembling by using the Open Tool on the toolbar. This opens up a File Dialog; using which he can browse through the local file system and choose the file he is interested in. He can choose to import all the files he is interested in importing at one time or import them as and when needed. 5) Once the user chooses the file to be imported its Facet representation is obtained from the server. The user is then displayed the CAD files he has imported into the assembly environment. A streaming method is used to minimize the client's waiting period. 6) Once he is done with importing the CAD files the user then proceeds with the Assembly operations. The user starts this by choosing the Select Body Tool by clicking on the "SB" button on the toolbar. He then picks a Fixed Part and a Free Part. The Fixed Part is the body chosen first. The Free Part is chosen next. 7) If the user wishes to change the bodies chosen, he can clear the currently selected bodies by clicking on the Clear Button—"CB" button on the toolbar. 8) The user then specifies the faces which are to be constrained with each other. This is does by clicking on the "SF" button in the Toolbar and activating the Select Face tool. The user then chooses the face on the Fixed Part first and then the face on the Free Part. 9) If the user wishes to change the faces chosen, he can clear the currently selected faces by clicking on the Clear Face—"CF" button on the toolbar. 10) Once satisfied with his selection he can choose the desired constraint condition. In case of planar faces it is Mate—"M" Button and Align—"A". The details of these operations are explained in later sections. Depending on the users action the transformation is computed and applied to the Free Part. 11) The user can align the revolved surfaces or axes and make them coaxial. The conical surfaces when picked are unlike the planar surfaces. 12) The user can then proceed to constraint the body further by specifying further constraint conditions. Before choosing the next pair of Faces the current selection has to be cleared by clicking on the Clear Face—"CF" button. 13) Once the user is done with specifying the constraints between the pair of bodies he can then proceed to specify the constraints between another pair. At this point of time it is possible for the other Clients (Slave Clients) in the system to get the Assembly control by clicking on the Request Control—"RC" button. When a slave client requests control he becomes the Master Client and the current Master client becomes a slave. 14) The current Master Client can then proceed to import the next assembly component and assemble it by specifying his set of constraints. 15) The assembly file created by the user can be stored in our proprietary format (.CAS) in the database along with the other project related details. This is done using the Save—"S" button on the tool bar. 16) This saved file can then be opened later when the clients enter the same session. Thus the assembly session can be given persistence. The Clients can currently open the saved .CAS file by clicking on the Open—"O" button. They are presented with the saved assembly session, which can be further edited. 17) The users are also provided with the standard Zoom and Rotate Options. 18) Thus the users in a collaborative setup can assemble their subcomponents.

During assembly operation there are two parts that are active (in one embodiment). One of which is the base and the other is the free. This is represented in form of two classes the FixedPart and FreePart classes both of which have AssembledPart as the parent. These classes have the methods to return the coordinate system of the selected faces.

In one embodiment, the ClientViewerWindow contains an inner class called Assembly that takes care of assembly operations. It has been made an inner class to enable it to access the member variables of the ClientViewerWindow. The Assembly class contains three methods: 1) assemble0, which takes care of assembly when none of the axes are fixed; 2) assemble1, which takes care of assembly when one of the axes is fixed; and 3) assemble2, which takes care of assembly when two of the axes are fixed. The assembly transformations computed are stored in the Geometry class.

In one embodiment, the process of assembly is as follows. 1) The user begins assembly by choosing two geometries in the system (currently it is the first and second imported geometries), one of which is the fixed part and the other the free part. 2) Then the user proceeds to select one face each on the fixed and free part. 3) Once the fixed and free parts are chosen, the user chooses either the Mate or Align option. 4) At this stage the free part has all the degree of freedom possible. 5) The axes of the fixed and free part are now computed. The z-axis of the fixed part is taken as direction of the normal of the face. For the free part the z-axis is either the direction of the normal (Align) or negative direction of the normal (Mate). 6) Once the z-axis is computed the x-axis is taken as the direction vector between the first and second vertices of the Facet. 7) The y-axis is the cross product of the x and y-axis. 8) The origin is the first vertex of the Facet. 9) Thus the axes and origin for both the parts are computed. 10) Now the task is to determine the transformation required to transform the axes of the FreePart to that of the FixedPart. This is computed by multiplying the inverse of the FreePart coordinate axes matrix with that of the FixedPart coordinates axes. 11) The transformation computed in the previous step is applied to the FreePart. 12) As a result of this operation, the degree of freedom of the FreePart is reduced. It can no longer move along the direction of the normal (z-axis). This constraint is noted down. 13) Next the user performs steps 2, 3 to choose another pair of faces. 14) While computing the coordinates this time, the constraint established because of the previous assembly operation is taken into account. This is done by considering the constrained axis as the x-axis. 15) The z-axis is computed as in step 5. 16) The y-axis and origin are computed as in steps 7, 8. 17) Step 10 is used to compute the new transformation. 18) In this transformation the transformation along the constrained axis are removed. 19) The modified transformation is now applied to the FreePart. 20) This operation reduces the degree of freedom of the FreePart further. It can no longer move along the direction of the new normal (z-axis). This constraint is also noted down. 21) Next the user performs steps 2, 3 to choose another pair of faces. 22) While computing the coordinates this time, both the constraints established because of the previous assembly operations are taken into account. This is done by considering those two axes as the x and y-axis. 23) The origin is computed as in step 8. 24) Step 10 is used to compute the new transformation. 25) In this transformation the transformation along the two constrained axes are removed. 26) The modified transformation is now applied to the FreePart. 27) Thus the part is fully constrained. Any further assembly operations on these two parts are not permitted.

In one embodiment, the assembly file created by the user is stored in our proprietary format (.CAS) in the database along with the other project related details. The .CAS file has only the reference to the location in the database of the subcomponents forming the assembly and their respective transformations. This guarantees the security of the original CAD files uploaded by the users.

For handling cylindrical surfaces when a user selects them for applying assembly constraints a hierarchy relationship (according to one embodiment). The Cone Face has the member variables: origin_—the origin of the axis of revolution; axis_—the normal to the plane of the ellipse defining the CONE (i.e., the cone-axis); majAxis_—the major axis of the ellipse defining the CONE. In one embodiment, MeshManager on the server (written in C++) is modified to fill up member variables of Cone instance during faceting. During faceting each Face is queried to find out if it is a Cone, if so the details of origin, axes are obtained using the ACIS API's.

On the Client side when the user picks a surface, it is verified to check if it is an instance of Cone (according to one embodiment). The constraint handling for a Cone is treated different from that of a Plane.

Figure 18:
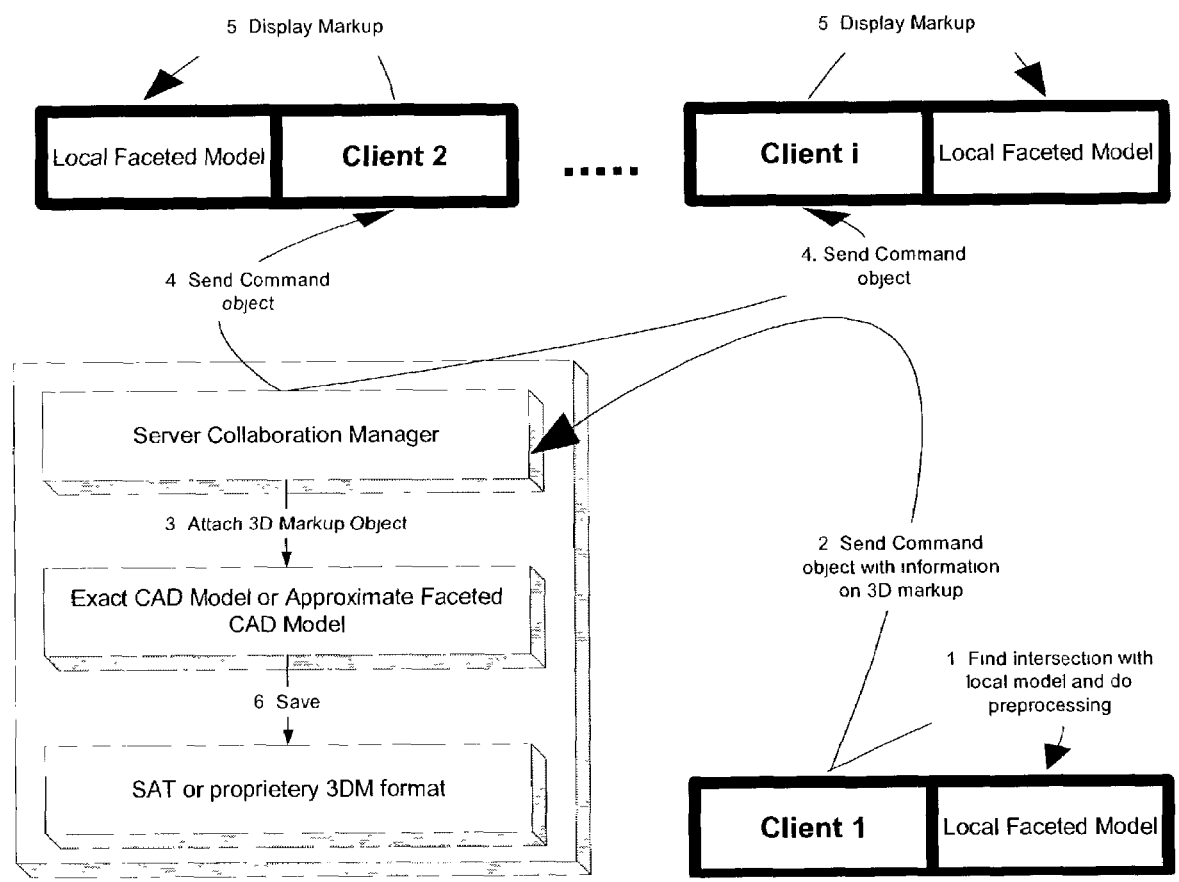
FIG. 18 illustrates a synchronization process for assembly, according to one embodiment of the present invention.

FIG. 18 shows the flow of the command objects during the assembly process, according to one embodiment. At any instant there is only one client with assembly control. That Master Client specifies the assembly constraint. The corresponding assembly transformation is computed on the Client end, applied to the Local Model and then transferred to the Server. The Server applies the transformation to the Master Model and then synchronizes the rest of the clients in the session using the Command object.

To address bandwidth issues, the writeObject( ) and readObject( ) interfaces of the Serializable interface are implemented. The data is piped through the GZIPOutputStream while serialization and GZIPInputStream during deserialization.

| File | CAD File Size | Default | Sending Compressed FacetData | Factor | Factor Of File size |
|---|---|---|---|---|---|
| Part12.step | 753,664 | 1,603,551 | 91,571 | 17.51 | 8.23 |

The table above shows that the compression achieves significant reduction in the size of the data to be sent across.

Streaming

In some embodiments, streaming allows 3-D data, like the components of the assembly, to be transmitted across networks incrementally rather than all at once. As a user views and manipulates a model, the streaming algorithm automatically downloads the portions the user sees. This technique allows a user to operate on highly complex models right over the Internet. Instead of waiting for the whole assembly to be downloaded streaming technology only downloads the portions of the assembly that the client sees. FIG. 19 through FIG. 23 show aspects of streaming operations, according to various embodiments of the invention.

Figure 19:
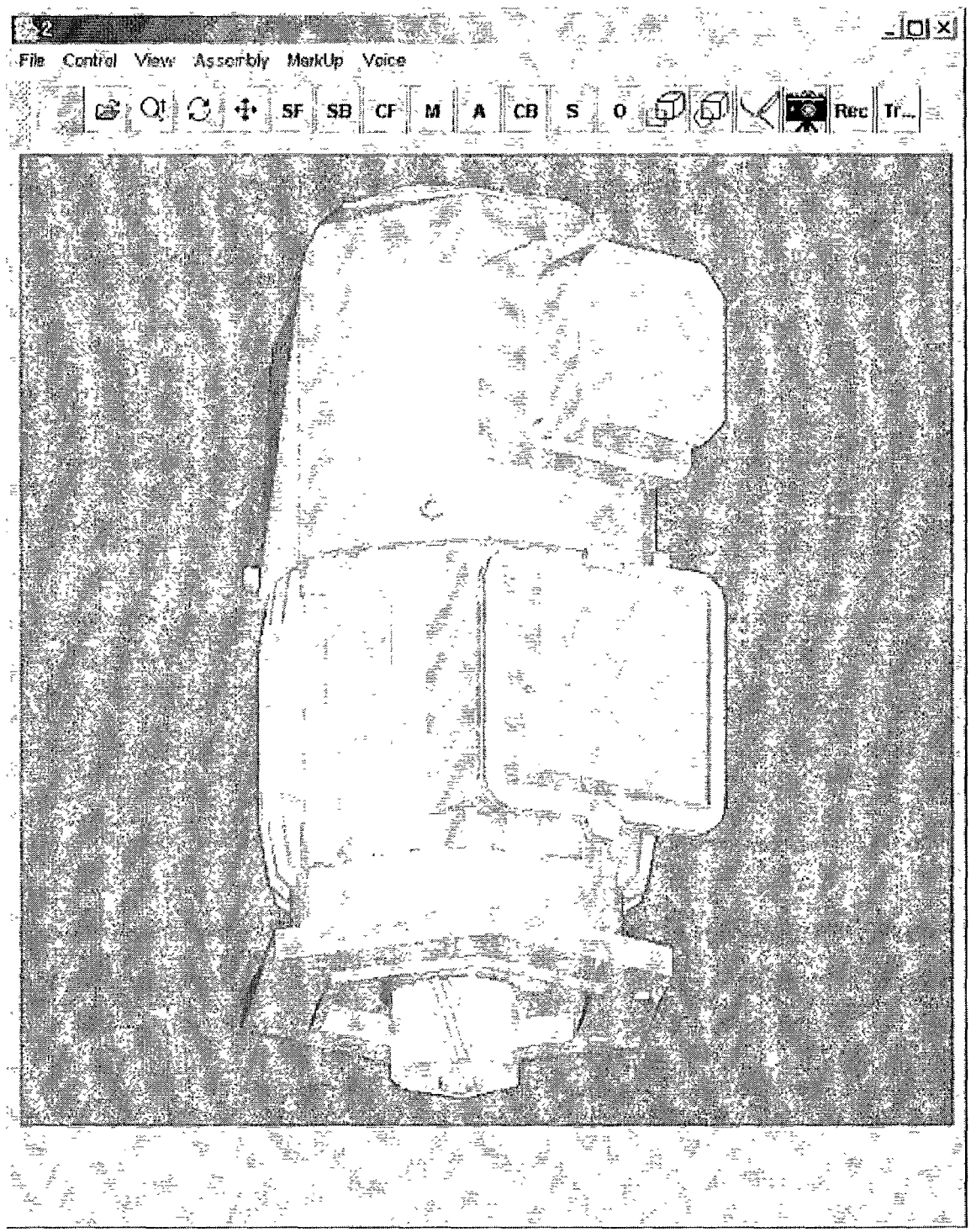
FIG. 19 illustrates a screen display of a first assembly streaming operation, according to one embodiment of the present invention.
Figure 20:
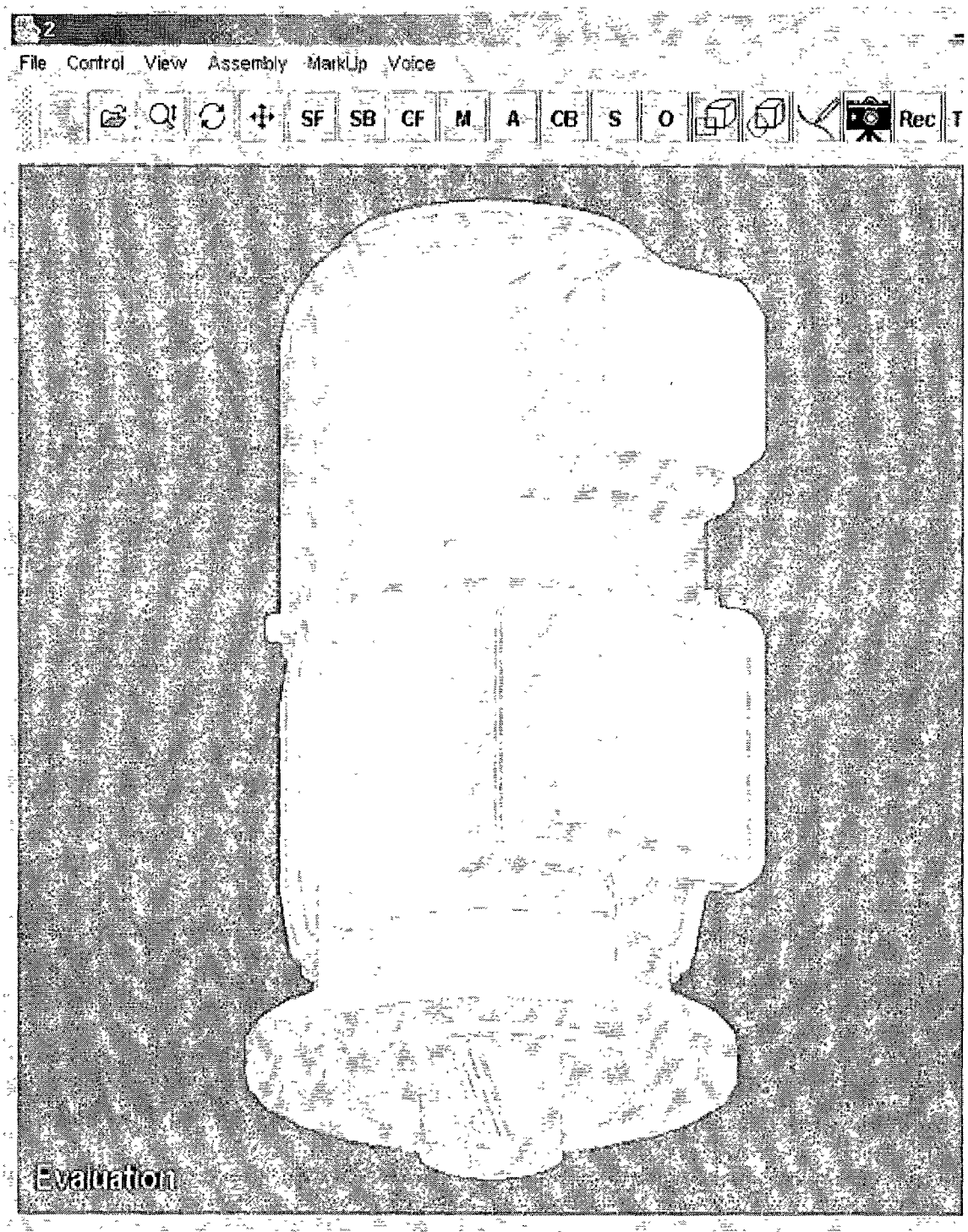
FIG. 20 illustrates a screen display of a second assembly streaming operation, according to one embodiment of the present invention.
Figure 21:
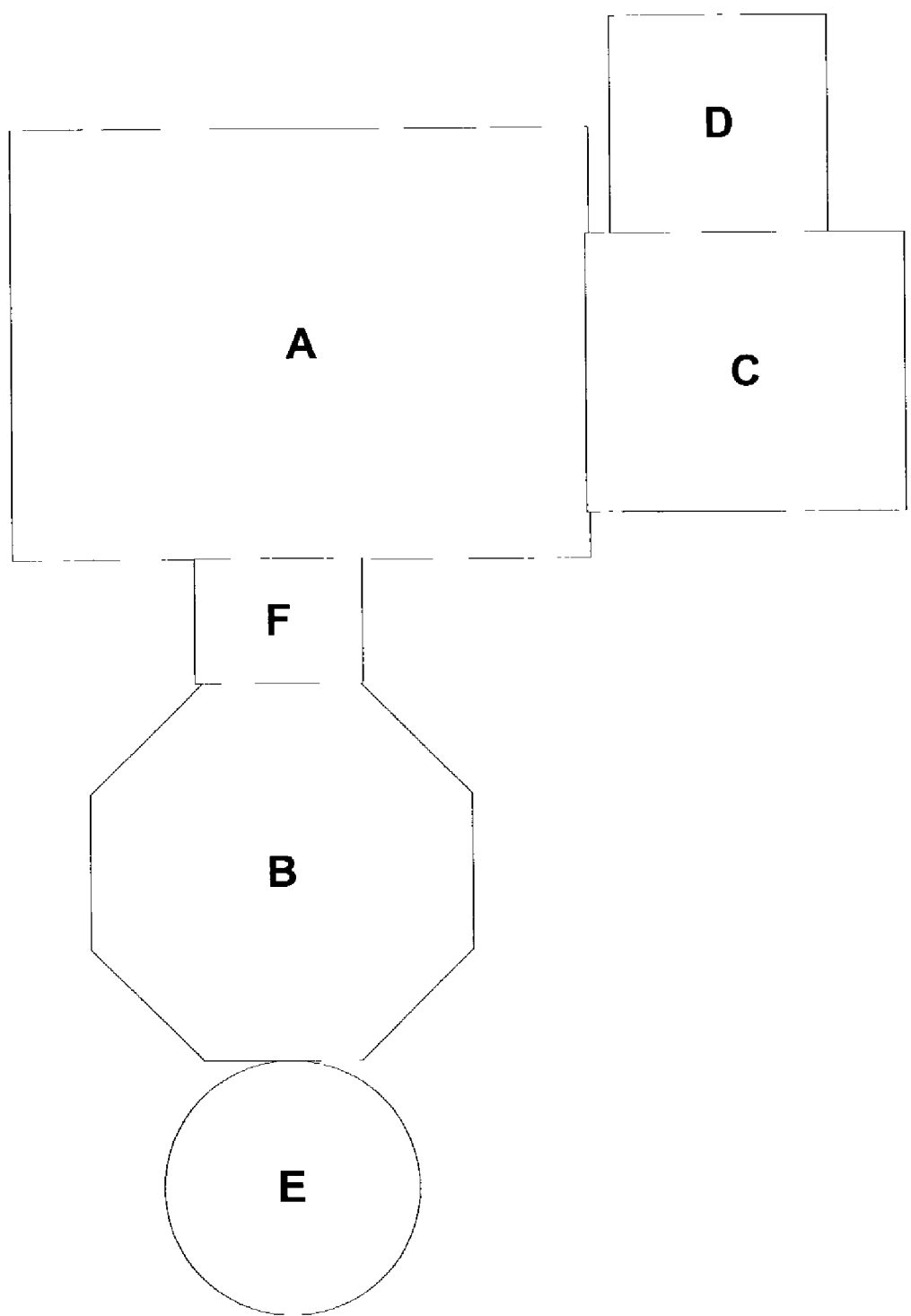
FIG. 21 illustrates a diagram of an assembly to be streamed, according to one embodiment of the present invention.
Figure 22:
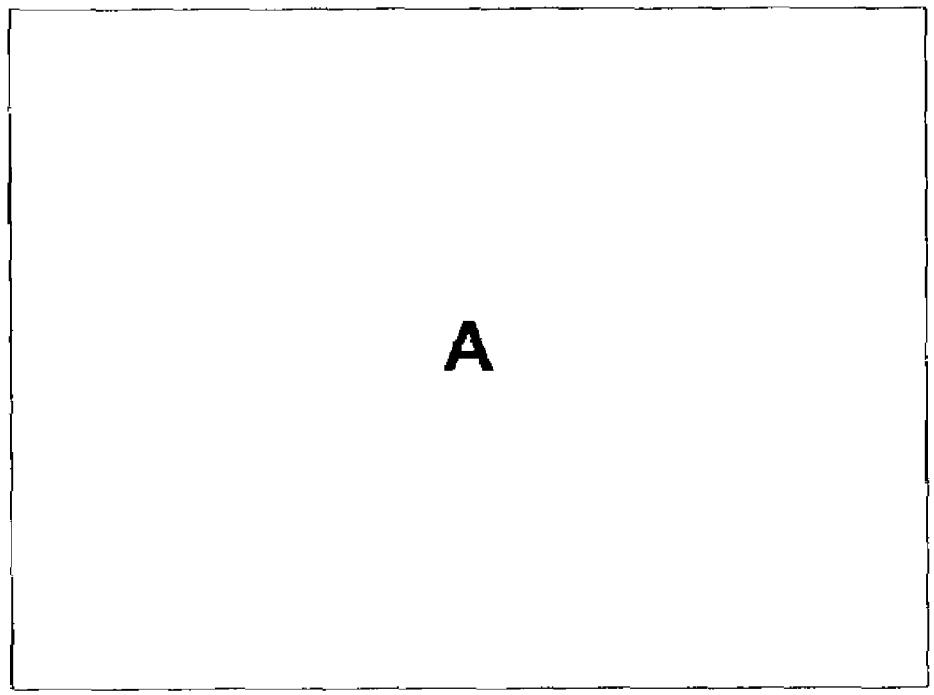
FIG. 22 illustrates a diagram of a first streaming operation, according to one embodiment of the present invention.
Figure 22:
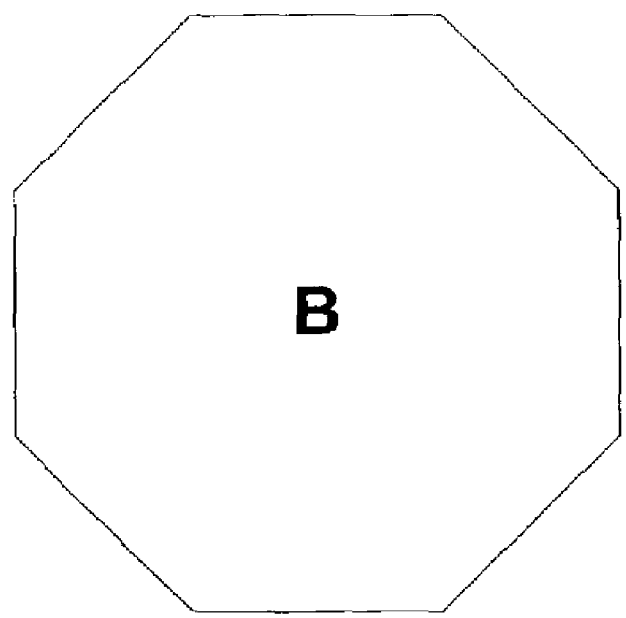
Figure 23:
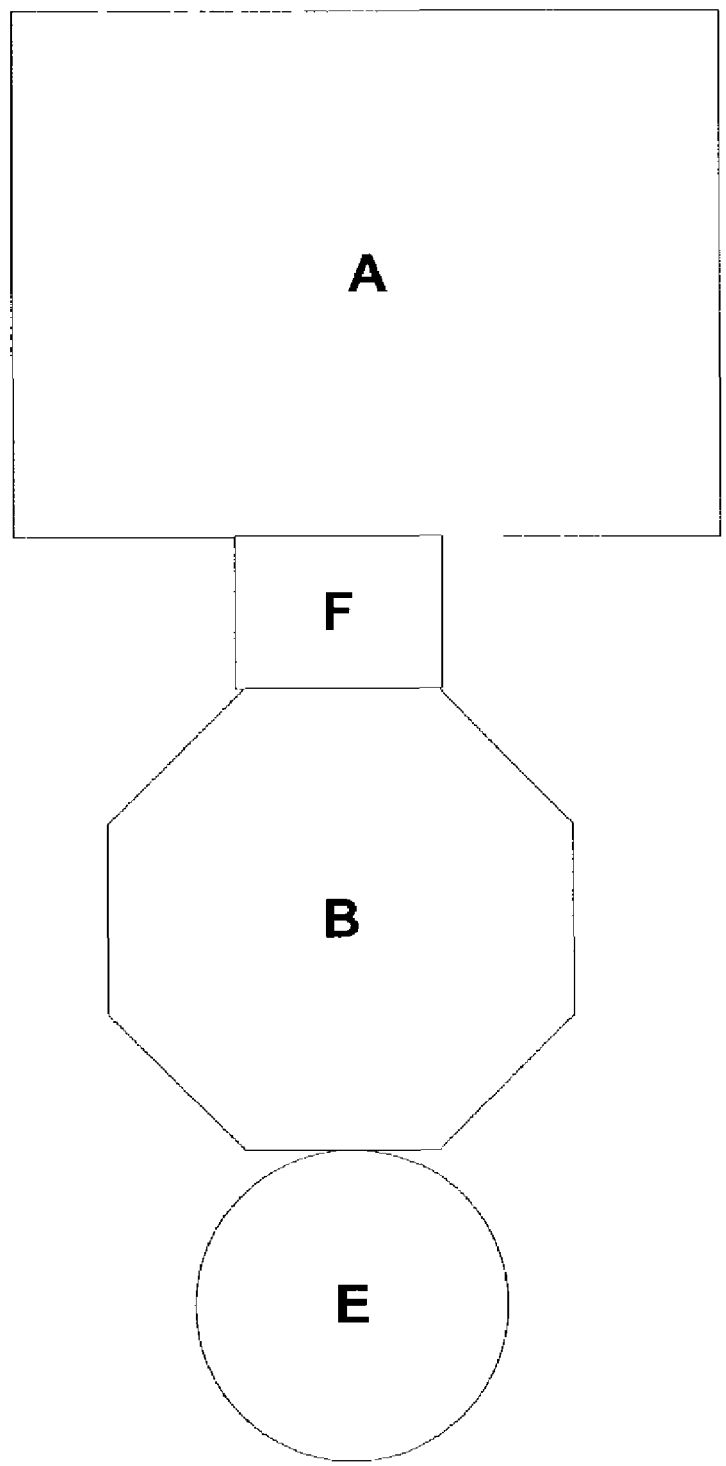
FIG. 23 illustrates a diagram of a second streaming operation, according to one embodiment of the present invention.

In one embodiment, the steps in the streaming algorithm are as follows. 1) Streaming module in the Server determines the bandwidth of the connection. 2) The optimal size of the data packets is calculated based on the bandwidth. 3) The subcomponents in the assembly are sorted based on their volume. Subcomponents are ordered as A, B, C, D, E and F based on volume in FIG. 21 (according to one embodiment). 4) The subcomponents with larger volumes are streamed first. 5) Initially the coarse facet data computed using the Solid Modeling Module is sent. FIG. 19 shows the coarse facet data generated (according to one embodiment). 6) The facet data is distributed to the Clients in the form of Command Objects using the Collaboration Module. 7) If the user's view position doesn't change the whole assembly is streamed based on volume only. (Order A, B, C, D, E and F in FIG. 21, for one embodiment.) 8) If the user's view position is changed dynamically during the streaming process, it automatically prioritizes the streaming data. On changing his view position, the "next set of facet data" that is closer to his current object in focus is sent from the Streaming Module. Thus, as the user zooms in on a particular subcomponent the components located near it are streamed first. If the currently streamed parts are A and B (FIG. 22, in one embodiment) and user focuses in on component B, the components that are near, E and F are sent next (FIG. 23). Then the remaining components, C and D are streamed in. 9) Only the subcomponents which are not occluded by already streamed in subcomponents are sent. 10) Once the coarse representation of all the subcomponents in the user view is streamed in, the detailed facet data is streamed in. FIG. 20 shows the detailed facet data generated, according to one embodiment.

In one embodiment, progressive encoding is implemented, where data is sent in a coarse-to-fine manner. In progressive encoding, a very coarse approximation is transmitted first, followed by bits that allow the progressive addition of more details. These bits are inserted into the existing facet data object. This allows the user to get an early grasp of the geometry.

The view-dependent streaming enables streaming the components the user is currently interested in. If the user wants to view the suspension system in a complex assembly like a car having many subcomponents, the user does not have to wait for the whole assembly data to be transferred. By using streaming, a coarse representation of the assembly is sent first. Once the user has the coarse representation, the user can zoom into his location of interest to obtain a finer-level representation.

Interference Visualization

Once the users complete the assembly constraint specification the Assembly module checks for interference (according to some embodiments). If interference is detected the overlapping region is computed using the solid modeling kernel. This region is displayed to the clients in a different color from the original cad models. Thus the users are warned of the problems in the assembly immediately and they can take appropriate remedial action.

Voice Annotation

Voice annotation allows designers to comment on higher-level concerns than those using textual annotations. The architecture of various embodiments of the invention supports voice annotation on 3D CAD models. This helps the designers to archive their higher-level design decisions for later retrieval. The voice is associated with specific features in the design and hence will remove miscommunication of details.

In one embodiment, the user is allowed to pick the location on the part to which the voice is to be attached and then start recording. Once the annotation is completed this annotation is made available to all the clients in the sessions. It appears in the form of an electronic post-it icon attached to the part (in one embodiment). The other clients listen to the recorded annotation by clicking on the electronic post-it icon.

In one embodiment, voice information (voice annotation) and data information (3D markup) are transmitted on a voice channel and a data channel. Time stamps are generated to synchronize the voice and data information. The voice and graphic or other data is played back in the exact sequence and at a rate corresponding to the rate at which it was received. This allows parties to communicate both voice, graphical information, or other data interactively (or to retrieve such information synchronously) in the exact sequence in which it was created.

In one embodiment, the voice streaming is accomplished using smaller data packets and a faster protocol, such as the User Datagram Protocol (UDP). This allows real-time distribution of the voice data to all the clients in the session.

In one embodiment, the general architecture is extended to include a Controller and Viewer for recording and playing the voice annotation. The object synchronization mechanism across clients using Command Objects is utilized to distribute the voice annotation to all the clients in the session. In one embodiment, an AudioController class acts as the Controller used by the user to record the voice input. This voice is stored in the form of bytes in memory. The AudioData class encapsulates the bytes of the voice data. This AudioData object created is held in the Product object on which the annotation was made.

Once the annotation is complete, the AudioData is streamed to the other clients using the appropriate Command Objects (in one embodiment). Once the clients receive the data, the AudioPlayer class acts as the view for this voice data, so that the user can listen to the annotation that was made.

Advantages

There are many advantages of an integrated collaborative architecture. For example, user role is used to determine who can modify a particular part and also portions of part or other information. Software is easily scalable since it uses MVC and Command Patterns. The architecture keeps minimum load at the client so that client size and computing power is minimal. The network load is optimized for editable and non-editable portions of the model. Most of the operations required for shape design are available to the client. Transferring an approximate model instead of the exact model of the shape reduces the network load. Capacity to generate voice as an object and pass it to clients along with other objects is advantageous. Attaching voice to part geometry and giving persistence to it is also beneficial. This along with the snapshot of the session could be emailed later along with the CAD part. The association of 3D Markup along with annotation, snapshots, and voice to a particular product model can be retrieved later and used. Thus history of the design process is maintained.

With regards to 3D markup, there are many advantages. For example, 3D markup provides the users a three-dimensional visualization tool for collaborative discussion of features such as positioning of the parting line(s) on an object as shown in FIG. 14A thru 14C. It allows a user to save and retrieve the markup for later use and review. Unlike 2D markup, 3D markup is preserved across views.

With regards to feature modeling, there are many advantages. For example, feature modeling provides user an easy to use interface to operate on model. It works with different types of files, which are created in other standard CAD packages. It uses same model data for viewing and modeling and it lies on client side so that network load is reduced and client will not need to go to server to get visualization data if the viewing parameters are changed. Feature modeling also gives persistence to model and features so that all information is retained and can be used for further use.

With regards to assembly, there are many advantages. For example, assembly provides support for efficient definition, manipulation and management of assemblies taken into fundamental consideration in the design of the software architecture. The architecture leads to the following features. 1) Enabling streaming to be done to the assembly. 2) Loading only the display data for an object into memory unless the object is activated for edit. This minimizes the memory footprint for a given assembly and maximizes the assembly size that can be effectively worked with. 3) Allowing the user to decide how the assembly is to be distributed into files—each component in a separate file, the entire assembly in one file, or anywhere in between. 4) The CAD models reside in the client's respective database location in the server. During assembly only the display related data is sent to the clients. This provides security to the CAD models. The clients can thus assemble their CAD parts, knowing that details their CAD model is not exposed to the other participants during assembly. 5) Providing tools to manage the scope of the assembly display and a browser for viewing and manipulating the assembly using its tree graph. 6) Controlling for object sign-out/sign-in and management of revisions. 7) Critical parameters and geometry can be associatively shared between subparts. At the part level, subpart shapes are merged together and, if desired, combined using Boolean operators.

With regards to voice collaboration, there are many advantages. For example, such collaboration provides the capability to attach voice to the 3D part that can be saved and retrieved later. It also allows archival of voice and associated part mark-up for later retrieval.

There are also advantages (in certain embodiments of the invention) for bitmap and writing collaboration. For example, snapshots from any application, CAD, PowerPoint, and Word etc. can be uploaded. Clients don't need to have the specific applications, CAD, PowerPoint, and Word etc. installed. In addition, all the user interactions can be saved inform of snapshots, which could be retrieved later.

These and other advantages will be apparent to those skilled in the art upon reading the present disclosure.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the described embodiments of the present invention.

What is claimed is:

1. A computer-implemented method for collaborative three-dimensional (3D) markup, the method comprising:
    obtaining a 3D representation of a shape on a client using a web-based interface, wherein obtaining a 3D representation of a shape on a client using a web-based interface includes obtaining a faceted 3D representation of a shape on a client using a web-based interface;
    displaying the 3D representation of the shape in a user workspace;
    marking directly on a portion of the 3D representation of the shape in the user workspace, wherein marking directly on the portion of the 3D representation of the shape includes processing a sequence of intersection points of rays cast from user-selected window locations with one or more facets of the portion of the 3D representation of the shape;
    displaying the marked-up 3D representation of the shape; and
    sending the marked-up 3D representation of the shape to one or more additional clients using the web-based interface,
    wherein the additional clients are capable of displaying the marked-up 3D representation of the shape in their respective user workspaces.

2. A computer-implemented method for collaborative three-dimensional (3D) markup, the method comprising:
    obtaining a 3D representation of a shape on a client using a web-based interface;
    displaying the 3D representation of the shape in a user workspace;
    marking directly on a portion of the 3D representation of the shape in the user workspace;
    displaying the marked-up 3D representation of the shape;
    sending the marked-up 3D representation of the shape to one or more additional clients using the web-based interface; and
    tracking client workspace usage time,
    wherein the additional clients are capable of displaying the marked-up 3D representation of the shape in their respective user workspaces.

3. A computer-implemented method for collaborative three-dimensional (3D) markup, the method comprising:
    obtaining a 3D representation of a shape on a client using a web-based interface;
    displaying the 3D representation of the shape in a user workspace;
    marking directly on a portion of the 3D representation of the shape in the user workspace;
    displaying the marked-up 3D representation of the shape;
    sending the marked-up 3D representation of the shape to one or more additional clients using the web-based interface; and
    providing collaborative 3D voice functionality to associate a voice component with the marked-up 3D representation of the shape,
    wherein the additional clients are capable of displaying the marked-up 3D representation of the shape in their respective user workspaces.

4. A computer-implemented method for collaborative three-dimensional (3D) markup, the method comprising:
    obtaining a 3D representation of a shape on a client using a web-based interface;
    displaying the 3D representation of the shape in a user workspace;
    marking directly on a portion of the 3D representation of the shape in the user workspace;
    displaying the marked-up 3D representation of the shape;
    sending the marked-up 3D representation of the shape to one or more additional clients using the web-based interface; and
    providing collaborative 3D feature modeling functionality to model one or more features of the 3D representation of the shape,
    wherein the additional clients are capable of displaying the marked-up 3D representation of the shape in their respective user workspaces.

5. A computer-implemented method for collaborative thee-dimensional (3D) markup, the method comprising:
    obtaining a 3D representation of a shape on a client using a web-based interface;
    displaying the 3D representation of the shape in a user workspace;
    marking directly on a portion of the 3D representation of the shape in the user workspace;
    displaying the marked-up 3D representation of the shape;
    sending the marked-up 3D representation of the shape to one or more additional clients using the web-based interface; and
    providing collaborative 3D assembly functionality to assemble one or more constraints of the 3D representation of the shape, wherein the additional clients are capable of displaying the marked-up 3D representation of the shape in their respective user workspaces.

6. A computer-implemented method for collaborative three-dimensional (3D) feature modeling, the method comprising:

selecting a 3D base feature from a library having one or more preexisting 3D shape features with built-in constraints using a web-based interface;

displaying the 3D base feature on a client in a user workspace;

modifying the 3D base feature in the user workspace using one or more predefined parameters;

displaying the modified 3D base feature in the user workspace;

sending the modified 3D base feature to one or more additional clients; and tracking client workspace usage time, wherein the additional clients are capable of displaying the modified 3D base feature in their respective user workspaces.

7. A computer-implemented method for collaborative three-dimensional (3D) feature modeling, the method comprising:

selecting a 3D base feature from a library having one or more preexisting 3D shape features with built-in constraints using a web-based interface;

displaying the 3D base feature on a client in a user workspace;

modifying the 3D base feature in the user workspace using one or more predefined parameters;

displaying the modified 3D base feature in the user workspace;

sending the modified 3D base feature to one or more additional clients; and providing collaborative 3D voice functionality to associate a voice component with the modified 3D base feature, wherein the additional clients are capable of displaying the modified 3D base feature in their respective user workspaces.

8. A computer-implemented method for collaborative three-dimensional (3D) assembly, the method comprising:

obtaining a first 3D representation of a first shape component on a client using a web-based interface, wherein obtaining a first 3D representation of a first shape component on a client using a web-based interface includes obtaining a first 3D representation of a first shape component using a first streaming operation;

obtaining a second 3D representation of a second shape component on the client using the web-based interface, wherein obtaining a second 3D representation of a second shape component on a client using a web-based interface includes obtaining a second 3D representation of a second shape component using a second streaming operation;

displaying the first and second 3D representations in a user workspace;

modifying a position or orientation constraint of the first 3D representation with respect to the second representation;

displaying the modified first and second 3D representations in the user workspace; and sending the modified first and second 3D representations to one or more additional clients, wherein the additional clients are capable of displaying the modified first and second 3D representations in their respective user workspaces, and wherein the first and second streaming operations occur sequentially, and wherein the second streaming operation occurs after the first streaming operation.

9. The computer-implemented method of claim 8, wherein:

obtaining a first 3D representation of a first shape component using a first streaming operation includes streaming a large 3D representation of a first shape component according to a first display priority; and obtaining a second 3D representation of a second shape component using a second streaming operation includes streaming a small 3D representation of a second shape component according to a second display priority.

10. The computer-implemented method of claim 8, wherein:

streaming a large 3D representation of a first shape component according to a first display priority includes streaming a large 3D representation of a first shape component in a coarse-to-fine manner; and streaming a small 3D representation of a second shape component according to a second display priority includes streaming a small 3D representations of a second shape component in a coarse-to-fine manner.

11. A computer-implemented method for collaborative three-dimensional (3D) assembly, the method comprising:

obtaining a first 3D representation of a first shape component on a client using a web-based interface;

obtaining a second 3D representation of a second shape component on the client using the web-based interface;

displaying the first and second 3D representations in a user workspace;

modifying a position or orientation constraint of the first 3D representation with respect to the second representation, wherein modifying a position or orientation constraint of the first 3D representation with respect to the second representation includes modifying a position or orientation constraint of the first 3D representation with respect to the second representation without using a computer-aided design (CAD) tool;

displaying the modified first and second 3D representations in the user workspace; and sending the modified first and second 3D representations to one or more additional clients, wherein the additional clients are capable of displaying the modified first and second 3D representations in their respective user workspaces.

12. A computer-implemented method for collaborative three-dimensional (3D) assembly, the method comprising:

obtaining a first 3D representation of a first shape component on a client using a web-based interface;

obtaining a second 3D representation of a second shape component on the client using the web-based interface;

checking the modified first and second 3D representations for interference;

highlighting overlapping regions of the modified first and second 3D representations that contain interference, displaying the first and second 3D representations in a user workspace;

modifying a position or orientation constraint of the first 3D representation with respect to the second representation;

displaying the modified first and second 3D representations in the user workspace; and sending the modified first and second 3D representations to one or more additional clients;

wherein the additional clients are capable of displaying the modified first and second 3D representations in their respective user workspaces.

13. A computer-implemented method for collaborative three-dimensional (3D) assembly, the method comprising:

obtaining a first 3D representation of a first shape component on a client using a web-based interface;

obtaining a second 3D representation of a second shape component on the client using the web-based interface;

displaying the first and second 3D representations in a user workspace;

modifying a position or orientation constraint of the first 3D representation with respect to the second representation;

displaying the modified first and second 3D representations in the user workspace;

sending the modified first and second 3D representations to one or more additional clients; and providing collaborative 3D voice functionality to associate a voice component with the modified first or second 3D representations, wherein the additional clients are capable of displaying the modified first and second 3D representations in their respective user workspaces.

14. A computer-implemented method for collaborative three-dimensional (3D) assembly, the method comprising:

obtaining a first 3D representation of a first shape component on a client using a web-based interface;

obtaining a second 3D representation of a second shape component on the client using the web-based interface;

displaying the first and second 3D representations in a user workspace;

modifying a position or orientation constraint of the first 3D representation with respect to the second representation;

displaying the modified first and second 3D representations in the user workspace;

sending the modified first and second 3D representations to one or more additional clients; and tracking client workspace usage time, wherein the additional clients are capable of displaying the modified first and second 3D representations in their respective user workspaces.

15. A computer-implemented method in a collaborative three-dimensional (3D) design system, the method comprising:

obtaining a 3D representation of a shape on a client using a web-based interface;

displaying the 3D representation of the shape in a user workspace;

associating an active component with a portion of the 3D representation of the shape, the active component being selected from a group consisting of a voice component having one or more voice signals, a bitmap image component, and a writing component;

sending the active component and its associated portion of the 3D representation of the shape to one or more additional clients using the web-based interface, wherein the additional clients are capable of processing the active component and displaying its associated portion of the 3D representation of the shape in their respective user workspaces.

16. The computer-implemented method of claim 15, wherein obtaining a 3D representation of a shape on a client using a web-based interface includes obtaining a 3D representation of a shape having both editable and non-editable portions.

17. The computer-implemented method of claim 15, wherein:

the additional clients are capable of listening to the active component if the active component is a voice component; and the additional clients are capable of displaying the active component if the active component is a bitmap image or a writing component.

18. The computer-implemented method of claim 15, wherein the method further comprises saving the active component and its associated portion of the 3D representation of the shape.

19. The computer-implemented method of claim 18, wherein the method further comprises retrieving the active component and its associated portion of the 3D representation of the shape.

20. The computer-implemented method of claim 15, wherein the method further comprises tracking client workspace usage time.

21. The computer-implemented method of claim 15, wherein the method is embodied in computer-executable instructions that are stored on a computer-readable medium.

* * * * *

UNITED STATES PATENT AND TRADEMARK OFFICE
CERTIFICATE OF CORRECTION

PATENT NO. : 7,337,093 B2
APPLICATION NO. : 10/286413
DATED : February 26, 2008
INVENTOR(S) : Karthik Ramani It is certified that error appears in the above-identified patent and that said Letters Patent is hereby corrected as shown below:

Title Page

On Page 2, under "OTHER PUBLICATIONS" please add the following references:

--"PageSeeder distributed document review," Weborganic Systems Pty Ltd., pp. 1-2

"Project Collaboration and Alternative Systems, "Autodesk Building Collaboration Services, www.autodesk.com/collaborate, pp. 1-8

"The STEP Project", National Institute of Standard and Technology NIST, http://www.nist.gov/sc4/www/stepdocs.htm, 1 Page "LEE, Jae Y., "Network-centric Feature-based Modeling", Electronics and Telecommunications Research Institute (ETRI), 3 pgs.--

In Column 7, please combine the paragraph ending on line 39 with the paragraph beginning on line 40, such that the paragraph appears as:

In one embodiment, the ClientViewerWindow acts as both a Controller and View. ClientViewerWindow uses the Opengl libraries via Magician to display the Model information. Using Magician functionality the user interaction, such as the mouse motion on the screen is also captured. The user typically using the controller, in our case either ClientViewerFrame or ClientViewerWindow, supplies the input. This input potentially causes a change in the Model data via the Application Program Interfaces (API's) exposed in the ModelInterface. When the Model finds that its data has been changed using the controller it triggers the

UNITED STATES PATENT AND TRADEMARK OFFICE
CERTIFICATE OF CORRECTION

PATENT NO. : 7,337,093 B2
APPLICATION NO. : 10/286413
DATED : February 26, 2008
INVENTOR(S) : Karthik Ramani It is certified that error appears in the above-identified patent and that said Letters Patent is hereby corrected as shown below:

updateView( ) function in the ClientViewerWindow via its updateViews( ) function."

Signed and Sealed this

First Day of September, 2009

David J. Kappos
*Director of the United States Patent and Trademark Office*